United States Patent [19]

Fujino et al.

[11] Patent Number: 4,779,117
[45] Date of Patent: Oct. 18, 1988

[54] EXPOSURE CONTROL DEVICE FOR A CAMERA

[75] Inventors: Akihiko Fujino, Sakai; Manabu Inoue, Kobe; Masaaki Nakai, Kawachinagano; Nobuyuki Taniguchi, Nishinomiya, all of Japan

[73] Assignee: Minolta Camera Kabushiki Kaisha, Osaka, Japan

[21] Appl. No.: 895,035

[22] Filed: Aug. 8, 1986

[30] Foreign Application Priority Data

Aug. 9, 1985 [JP] Japan .................. 60-176046

[51] Int. Cl.⁴ .............................. G03B 7/08
[52] U.S. Cl. .................. 354/434; 354/414; 354/400; 354/422; 354/475
[58] Field of Search ............ 354/429, 430, 431, 432, 354/433, 434, 413, 414, 416, 417, 418, 419, 420, 421, 422, 423, 472, 400, 475

[56] References Cited

U.S. PATENT DOCUMENTS 4,589,754 5/1986 Maitani et al. .................. 354/472
4,589,757 5/1986 Maitani et al. .................. 354/472

FOREIGN PATENT DOCUMENTS 59-123824 7/1984 Japan .

Primary Examiner—Russell E. Adams
Attorney, Agent, or Firm—Burns, Doane, Swecker & Mathis

[57] ABSTRACT

An exposure control device for a camera having light measuring elements capable of outputting an average light measurement corresponding to the brightness of the entire scene to be photographed, and outputting a spot light measurement corresponding to the brightness of a part of the scene to be photographed, wherein an exposure control is carried out based on the spot or average light measurements. In an exposure control for daylight photography, the exposure control is carried out based on the average light measurement or based on the spot light measurement at the time of an AE lock, and for flash photography, the exposure control is carried out based on the average light measurement regardless of whether the AE lock operation is carried out.

18 Claims, 30 Drawing Sheets

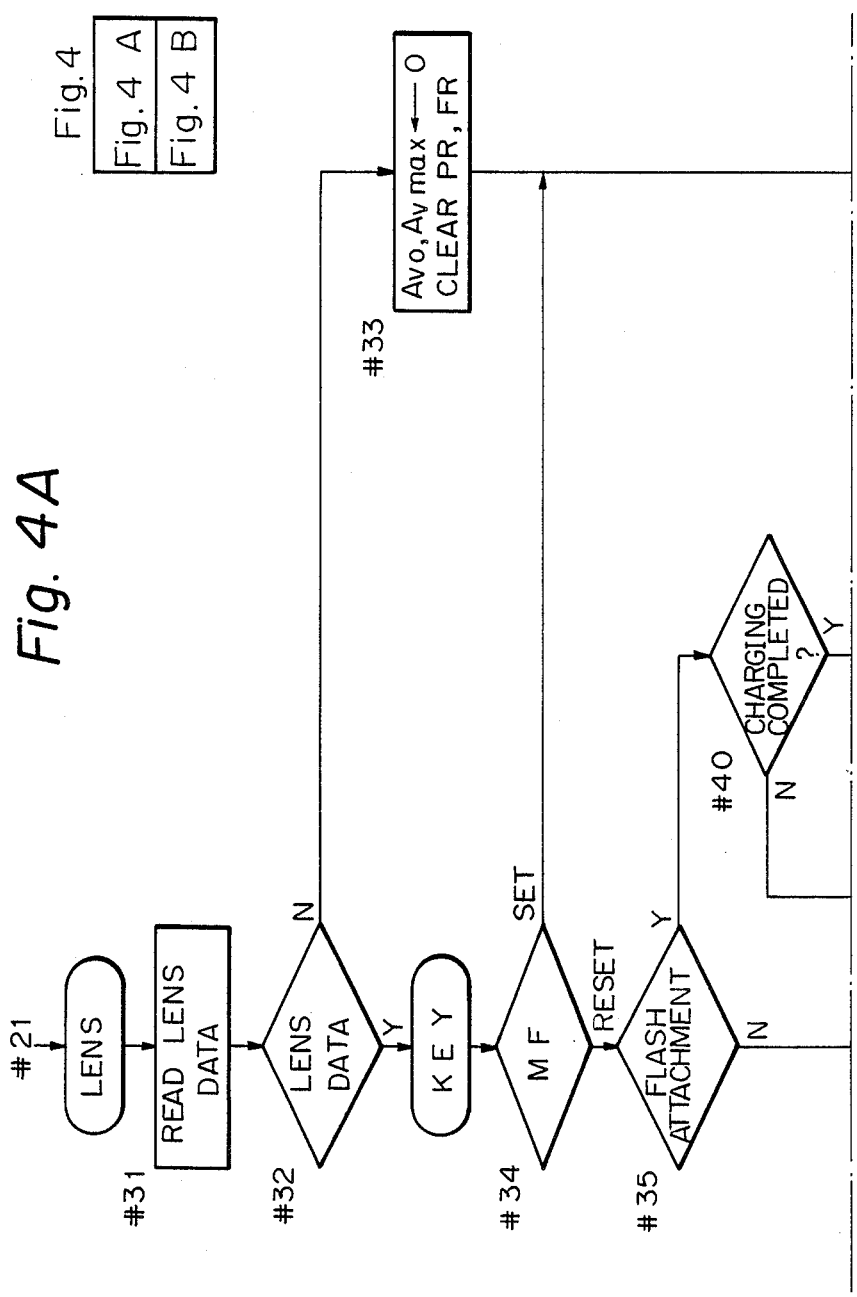

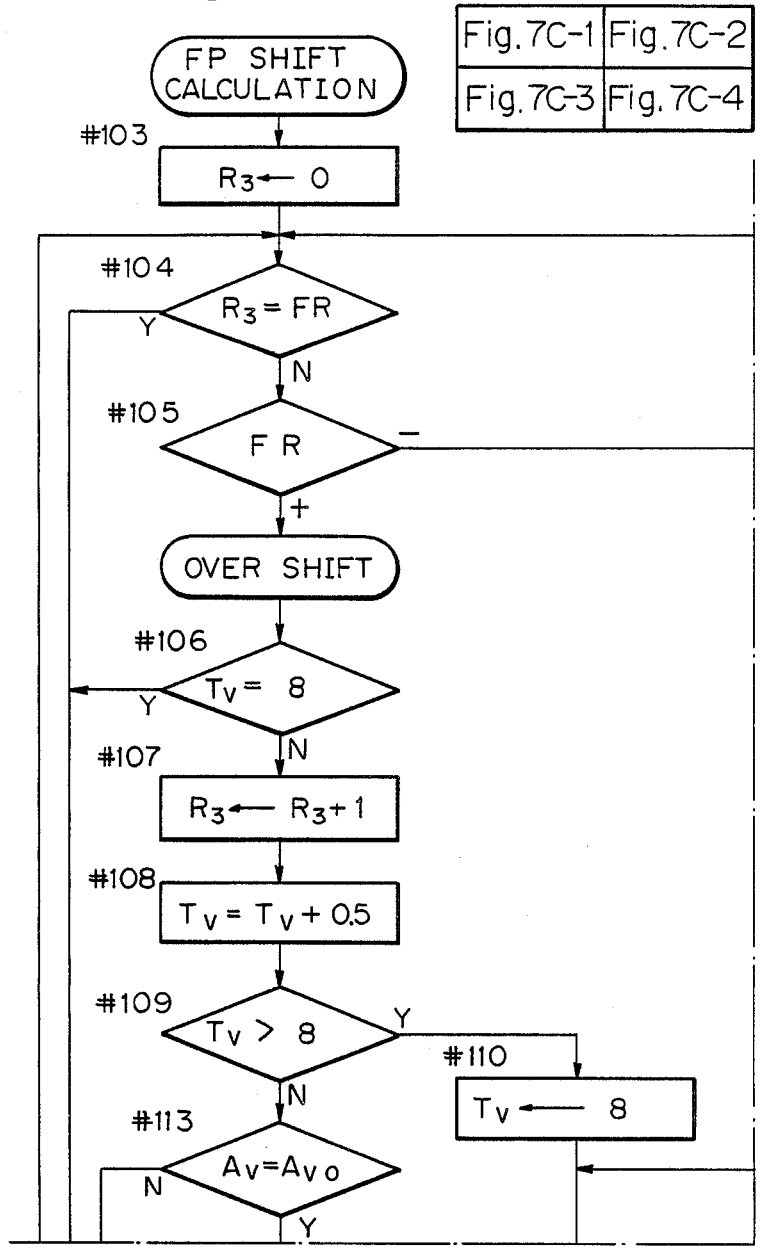

EXTERNAL
DISPLAY (7)   INNER-FINDER DISPLAY (15)

ALL LIT STATE

ALL NON-LIT STATE (MAIN SWITCH IS OPENED)

STANDBY STATE (MAIN SWITCH OFF, NON PHOTOMETERING)

STANDBY STATE (MANUAL MODE (S.S=1/250 SEC) SETTING STATE)

STANDBY STATE (MANUAL MODE (S.S=BULB) SETTING STATE)

Fig. 16

DISPLAY DURING PHOTOMETERING

| | P MODE | FP MODE |
|---|---|---|
| NORMAL | 1000 / F 5.6 <br> 1000 F5.6 | 250 / F 4 <br> 250 F4 |
| P SHIFT | P SHIFT / 500 / F 8 <br> 500 F8 P SHIFT | F SHIFT / 250 / F 5.6 <br> 250 F5.6 F SHIFT |
| AE LOCK | SPOT / 1000 / F 5.6 <br> 1000 F5.6 SPOT AEL | 250 / F 4 <br> 250 F4 AEL |
| AE LOCK + P SHIFT | SPOT PSHIFT / 500 / F 8 <br> 500 F8 SPOT AEL P SHIFT | FPSHIFT / 125 / F 5.6 <br> 125 F5.6 FP SHIFT AEL |
| MANUAL MODE | bulb / F 5.6 <br> bulb F5.6 | X250 / F 5.6 <br> −X250 F5.6 |

Fig. 19
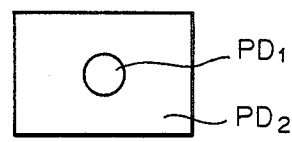
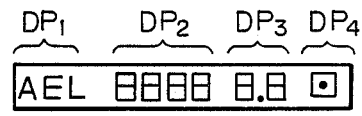
Fig. 20A
Fig. 20B
Fig. 20C
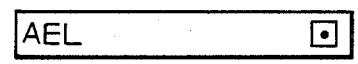
Fig. 20D

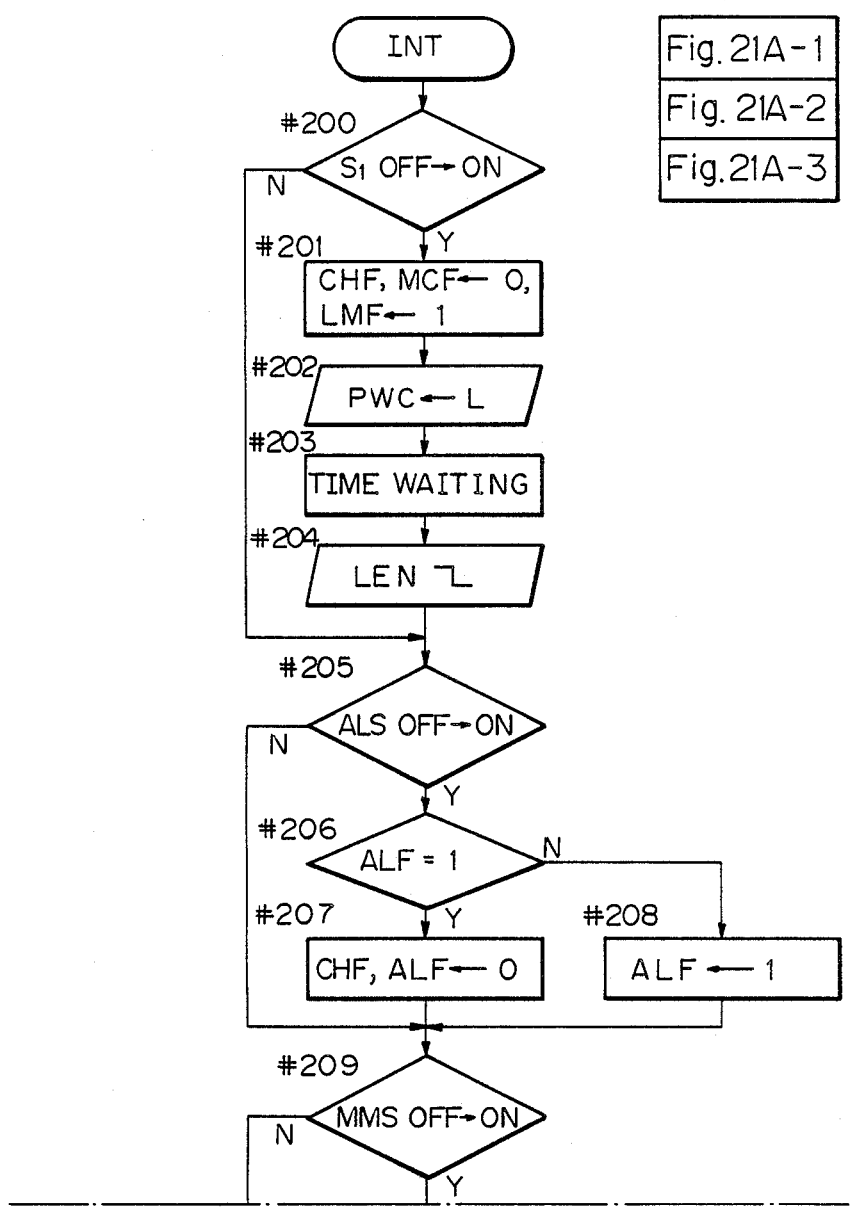

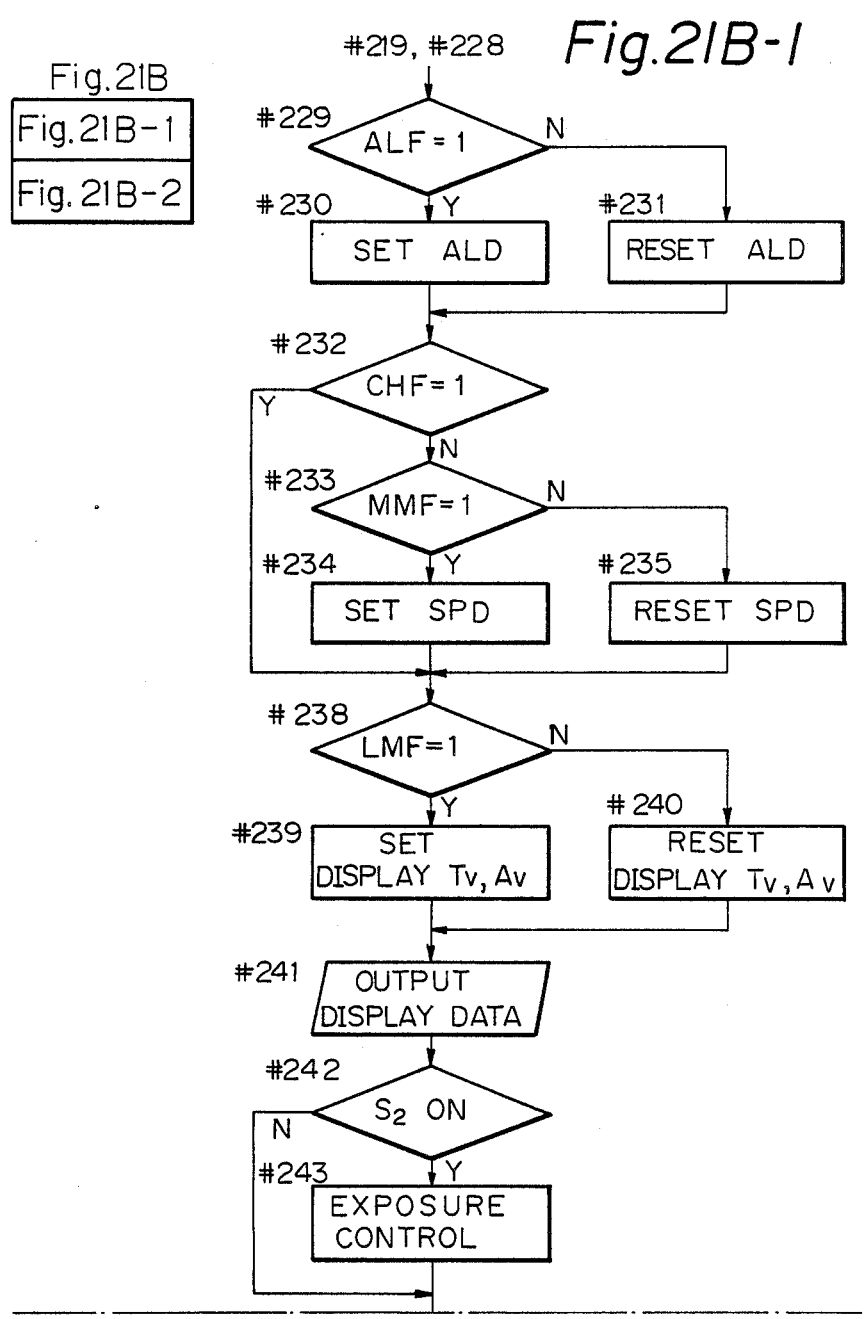

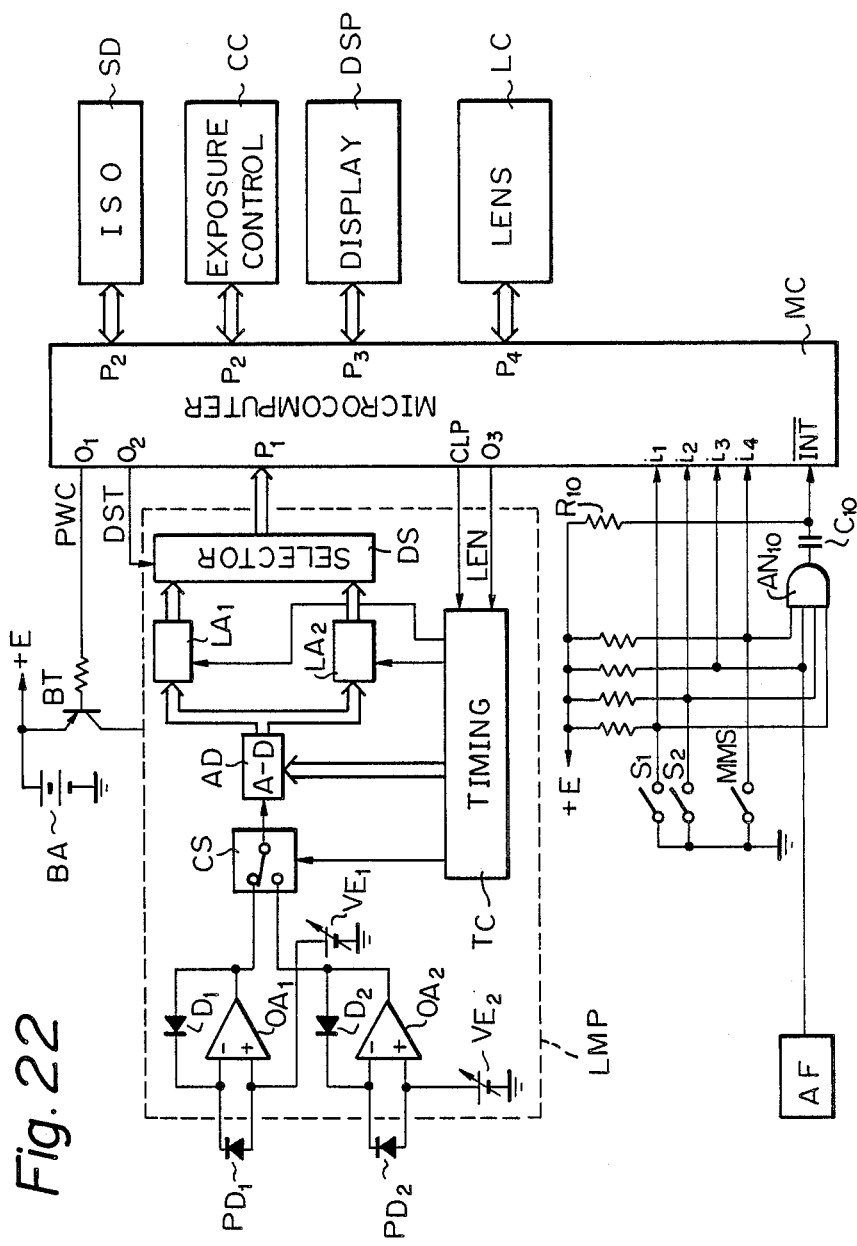

EXPOSURE CONTROL DEVICE FOR A CAMERA

BACKGROUND OF THE INVENTION

1. Field of the Invention

The present invention relates to an exposure control device for a camera. In particular, it relates to an exposure control device having a light measuring means for obtaining an average light measurement corresponding to a brightness of an entire scene to be photographed and a means for obtaining a spot light measurement corresponding to a brightness of a part of the scene, in which either the average or the spot light measurement is optionally selected.

2. Description of the Related Art

AE (automatic exposure) lock photography is often used when a part having a greatly different brightness is present in the scene to be photographed. In AE lock photography, the brightness of a desired part of the scene to be photographed is measured and stored regardless of a shutter release operation, and an exposure control is performed based on the stored spot light measurement. To achieve this combination of a spot light measurement and AE lock mode, the specification of U.S. Pat. No. 4,589,757 proposes an exposure control device in which a mode is automatically changed from a non-AE lock mode to an AE lock mode when a switch for carrying out a spot light measurement is manually operated. In this device, although a user is aware that a spot light measurement should be performed while in the AE lock mode, a great deal of skill is required to determine whether the average light measurement or the spot light measurement should be adopted for the scene to be photographed. Accordingly, where an AE-locked operation based on a spot light measurement is necessary, for a non-skilled beginner, the sequential operation of performing an AE lock prior to a shutter release operation is more easy than the operation of depressing the spot light measurement button switch after the necessity for a spot light measurement is determined, as in the conventional technique. Moreover, an exclusive AE lock changeover means is not provided in the conventional device, and thus, when the spot light measurement button switch is not operated, the average light measurement is automatically selected. However, in this state, an AE lock cannot be performed, and accordingly, operation of the conventional device is difficult for beginners. Moreover, the average light measurement is always performed for flash photography (the spot light measurement is not allowed), and AE-locked operation cannot be carried out.

SUMMARY OF THE INVENTION

It is a primary object of the present invention to provide an exposure control device for a camera in which, during a changeover between the average light measurement and the spot light measurement, an AE lock is easily performed even by beginners.

In accordance with a fundamental aspect of the present invention, there is provided an exposure control device for a camera, which comprises a first light measuring means for outputting an average light measurement corresponding to the brightness of the entire scene to be photographed, a second light measuring means for outputting a spot light measurement corresponding to the brightness of a part of the scene to be photographed, a manually operated AE lock switch, which regardless of a shutter release operation, can be changed between a non-AE lock position and an AE lock position, a signal output means for outputting a signal indicating a daylight photography exposure by daylight alone or a flash photography exposure by flash light in combination with daylight, a light measurement selecting means for selectively outputting an average light measurement from the first light measuring means or a spot light measurement from the second light measuring means, according to the position of the AE lock switch and the signal output by the signal output means, and an exposure control means for controlling an exposure based on the light measurement mode selected by the light measurement selecting means, this exposure control device selecting a light measurement mode such that when a daylight photography signal is input, the selective means outputs an average light measurement at the time of the shutter release operation with the AE lock switch in the non-AE lock position, and outputs a spot light measurement at the time of the AE lock operation with the AE lock switch in the AE lock position, and when a flash photography signal is input, the selecting means outputs an average light measurement at the time of the shutter release operation with the AE lock switch in the non-AE lock position and outputs an average light measurement at the time of the AE lock operation with the AE lock switch in the AE lock position.

BRIEF DESCRIPTION OF THE DRAWINGS

Embodiments of the exposure control device according to the present invention will now be described in detail with reference to the accompanying drawings, in which:

FIGS. 11 through 16 are diagrams illustrating elements displayed in the display part for respective operation modes of the camera;

FIG. 19 is a diagram illustrating the light receiving elements PD1 and PD2 arranged in the circuit shown in FIG. 18;

FIGS. 20A through 20D are diagrams showing elements displayed in the display part shown in FIG. 18;

FIG. 22 is a block diagram illustrating a circuit in another embodiment of the present invention.

DESCRIPTION OF THE PREFERRED EMBODIMENTS

A preferred embodiment of the present invention will now be explained with reference to FIGS. 1 through 17.

Figure 1:
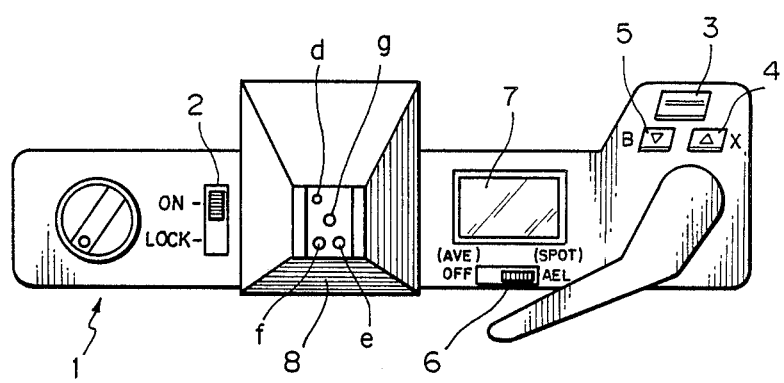
FIG. 1 is a top plan view of a camera to which the present invention is applied.
Figure 2:
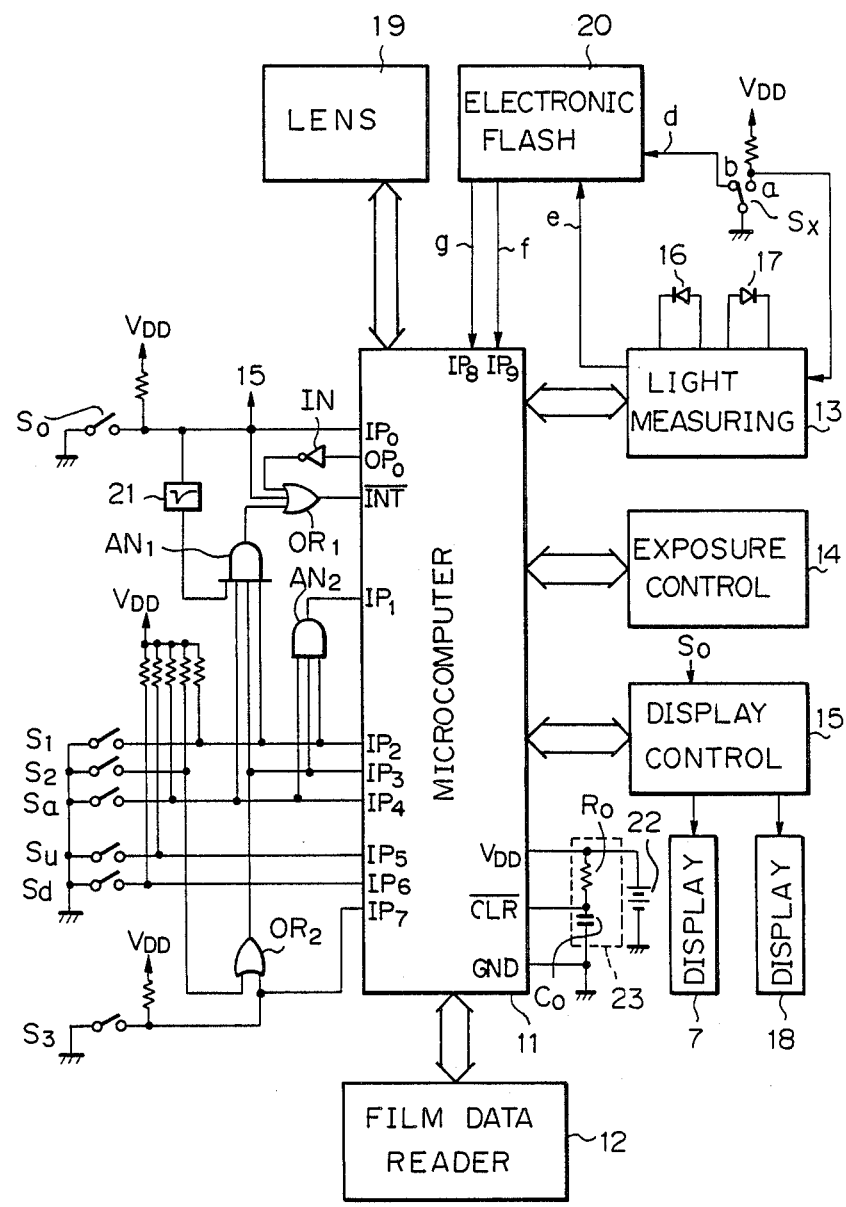
FIG. 2 is a block diagram illustrating a circuit structure of the camera shown in FIG. 1.

FIG. 1 is a plan view, seen from above, showing a single-lens reflex camera provided with a focal plane shutter, to which the present invention is applied, and FIG. 2 is a block diagram illustrating the circuit structure of the camera shown in FIG. 1. Referring to FIG. 1, a main switch 2, a shutter release button 3, an up-key 4, a down-key 5, an AE lock switch 6, a liquid crystal display part 7, and an accessory shoe 8 are arranged in the upper portion of a camera body 1. A symbol X indicating a flash synchronizable critical shutter speed (for example, 1/250 second) is located in the vicinity of the up-key 4 and a symbol B indicating the bulb exposure is located in the vicinity of the down-key 5.

At the time of AE lock photography, the AE lock switch 6 is operated regardless of the shutter release operation, i.e., prior to the shutter release operation, and a spot light measurement made by placing the AE lock switch 6 in the AE lock position is stored. The AE lock switch 6 can be changed from the AE lock position AEL, at which an AE lock can be performed, to the non-AE lock position OFF, at which the AE lock is not performed. The letters SPOT at the AE lock position indicate the spot light measurement mode, and the letters AVE at the non-AE lock position indicate the average light measurement mode. The AE lock switch 6 can be constructed by a push button instead of the slide switch shown in FIG. 1.

When the main switch 2 is in the ON position, power is supplied to the camera circuits for the light measurements and the exposure control is allowed. When the switch 2 is in the LOCK position, power is supplied only to the storage means, i.e., a microcomputer.

Referring to FIG. 2, the camera body 1 consists essentially of a microcomputer 11, a film data reader 12, a light measurement circuit 13, an exposure control circuit 14, and a display control circuit 15. The film data reader 12 is a circuit for reading film data formed as an electric code signal (hereinafter referred to as "DX code") on the side face of the outer circumference of a film cartridge, and outputting this code signal to the microcomputer 11. The light measurement circuit 13 is provided with a light receiving element 16 for an average light measurement and a light receiving element 17 for a spot light measurement. Note, these light receiving elements 16 and 17 are arranged outside the optical path of the camera to receive light passing through a camera lens and a half-transparent reflecting mirror and reflected from the surface of the shutter screen of the surface of the film.

Figure 12:

The exposure control circuit 14 controls the shutter speed and diaphragm aperture value according to the output of the microcomputer 11. The display control circuit 15 drives and controls a display part 18 in a view finder and the above-mentioned external display part 7 according to the output of the microcomputer 11. Note, when the main switch 2 is in the LOCK position, the control turns OFF all of the display elements of the two display parts, as shown in FIG. 12.

A camera lens 19 and an electronic flash device 20 are removably attached to the camera body 1. The camera lens 19 outputs inherent data of the lens, such as data determined by optical and mechanical characteristics and the diaphragm aperture value, to the microcomputer 11 of the camera body 1. The microcomputer 11 calculates an exposure control data based on this lens data, the above-mentioned film data, and the light measurement data. The electronic flash device 20 outputs flash data such as an attachment signal or charge completion signal to the microcomputer 11.

The microcomputer 11 comprises input terminals $IP_0$ through $IP_9$, an output terminal $OP_0$, an interrupt terminal $\overline{INT}$, and a clear terminal $\overline{CLR}$. When a signal at the interrupt terminal $\overline{INT}$ falls, the interrupt operation is started, and when a signal at the clear terminal $\overline{CLR}$ rises, a resetting operation described hereinafter is started.

Switches $S_0$, $S_u$, $S_d$, and $S_a$ are operated by the above-mentioned main switch 2, up-key 4, down-key 5, and AE lock switch 6. Note, when the main switch 2 is in the ON position, the switch $S_0$ is closed, and when the up-key 4 and down-key 5 are depressed, the switches $S_u$ and $S_d$ are closed. When the AE lock switch 6 is at the AEL position, the switch $S_a$ is closed. The switches $S_1$ and $S_2$ are operated by depression of the above-mentioned shutter release button 3. Namely, the light measurement switch $S_1$ is closed at the initial stage and at the final stage of the depressing operation; that is, the light measurement switch $S_1$ remains closed when the release switch $S_2$ is closed.

The switch $S_0$ is directly connected to the input terminal $IP_0$ of the microcomputer 11, and connected to the interrupt terminal $\overline{INT}$ through a one-shot circuit 21, an AND gate AN1, and an OR gate OR1. The outputs of the switches $S_1$ and $S_a$, and an OR gate OR2 described hereinafter are connected to the other terminal of the AND gate AN1. A reverse output of the output terminal $OP_0$ of the microcomputer 11 and the output of the switch $S_0$ are connected to the other input terminal of the OR gate OR1. The outputs of the switches $S_1$, $S_a$, $S_u$ and $S_d$ are directly connected to input terminals $IP_2$, $IP_4$, $IP_5$ and $IP_6$, respectively, of the microcomputer 11. The output of the switch $S_2$ is connected to an input terminal $IP_3$ of the microcomputer 11 through the OR gate OR2. Outputs of the switches $S_1$ and $S_a$ and the OR gate OR2 are input to an AND gate AN2 and the output thereof is connected to the input terminal $IP_1$ of the microcomputer 11. This input terminal $IP_1$ is provided to hold the light measurement state (hereinafter referred to as light measurement hold) for a predetermined time after one of the switches $S_1$, $S_2$, and $S_a$ is closed while a switch $S_3$ described hereinafter is closed.

The camera of the present embodiment operates in a program exposure control mode in which the combination of the shutter speed and the diaphragm aperture value is automatically determined based on a predetermined program line. There are two kinds of program modes, i.e., a program mode for daylight photography (hereinafter referred to as P mode) and a program mode for flash photography (hereinafter referred to as FP mode). In each mode, the combination set in the P mode or FP mode according to the respective program line can be shifted by manual operation while maintaining a proper exposure (hereinafter referred to as P shift or FP shift). Furthermore, in addition to this automatic exposure control mode, the camera is operable in a manual exposure control mode in which the shutter speed and the diaphragm aperture value can be manually set.

The selection between the program mode and the manual mode of exposure control is determined by a manual operation of the main switch 2, the up-key 4, and the down-key 5. That is, the program mode is selected when the main switch 2 is placed in the ON position, but the keys 4 and 5 are not depressed. The manual mode is selected when the main switch 2 is placed in the ON position and at the same time either the up-key 4 or the down-key 5 is depressed. Note, in the manual mode of this embodiment, only two kinds of shutter speeds are selectable, i.e., 1/250 second and bulb exposure. The shutter speed of 1/250 second is selected by depressing the up-key 4 and the shutter speed of bulb exposure is selected by depressing the down-key 5. After the shutter speed is selected, and the up-key 4 or the down-key 5 released from the depressed position, the diaphragm aperture value can be set by again depressing the up-key 4 or down-key 5.

The switch $S_3$ is opened upon completion of the exposure control operation of the exposure control circuit 14 and is closed upon completion of the film advance or film wind-up operation. This switch $S_3$ is directly connected to the input terminal $IP_7$ of the microcomputer 11 and to the other input terminal of the OR gate $OR_2$. Accordingly, if the film advance has not been completed, even if the shutter release button 3 is depressed to close the release switch $S_2$, the output of the OR gate $OR_2$ is kept high, and thus the microcomputer 11 will not carry out the exposure control operation. That is, when the opening of the switch $S_3$ is detected by the input terminal $IP_7$, the microcomputer 11 stops the exposure control operation.

A switch $S_x$ is a so-called flash synchro contact switch for the flash device 20. During the period from the point of completion of the travel of the front screen of the shutter to the point of completion of the travel of the rear screen of the shutter, the switch $S_x$ is connected to a contact b; otherwise, the switch $S_x$ is connected to a contact a. When the switch $S_x$ is connected to the contact a, the operation of integrating light reflected from the film surface in the light measurement circuit 13 is inhibited, and when the switch $S_x$ is connected to the contact b, the integrating operation of the light measurement circuit 13 and flashing of the electronic flash device 20 are started.

The light measurement circuit 13 comprises circuits provided at the light receiving element 16 for the average light measurement, and at the light receiving element 17 for the spot light measurement, respectively, an A/D converter for selectively receiving in time series the outputs of these two circuits, that is, the average light measurement (hereinafter referred to as AVE value) and the spot light measurement (hereinafter referred to as SPOT value) and subjecting these outputs to A/D conversion, and a data output register for once storing the A/D converted data and outputting the stored data (SPOT value and AVE value) to the microcomputer 11, according to commands received from the microcomputer 11. The microcomputer 11 performs the exposure calculation based on this data. Furthermore, the light measurement circuit 13 comprises a flash light control circuit for controlling the amount of flash light emission. The flash control circuit is composed of a film data reader for reading film sensitivity data sent from the microcomputer 11, a D/A converter for converting the film sensitivity data to an analog signal, an adder circuit for adding the film sensitivity signal from the D/A converter to the output of the average light measurement circuit, a circuit for performing integration of the output of the adder circuit when the switch $S_x$ is connected to the contact b, and a circuit for outputting a stop signal for terminating the emission of light from the electronic flash device 20 to a terminal e, when the integration value reaches a predetermined value.

When a Fill-In region (described hereinafter) is detected in the FP mode and a P shift is carried out in the FP mode, the flash light control circuit increases the film sensitivity data, for example, by 1 $E_v$ (exposure value) and feeds the increased value to the light measurement circuit to reduce the amount of flash light emission by 1 $E_v$ from the proper exposure level. For flash photography other than the above-mentioned case, the circuit controlling the amount of flash light emission outputs the film sensitivity data as it is to maintain the amount of flash light emission at a proper exposure level.

The electronic flash device 20 outputs a charge completion signal, indicating a completion of charging, to the input terminal $IP_8$ of the microcomputer 11 from an output terminal g, and the electronic flash device 20 outputs an attachment signal, indicating a closing of a power source switch (not shown in the figures) of the electronic flash device 20, to the input terminal $IP_9$ of the microcomputer 11 from an output terminal f.

Figure 3A:
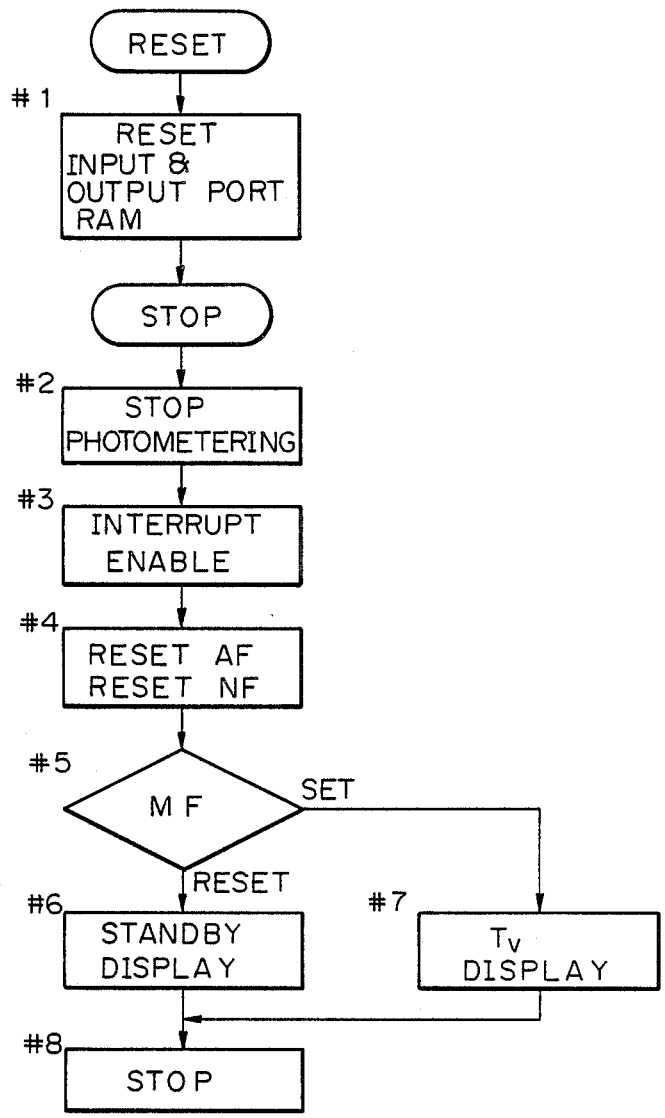
FIGS. 3A, 3B, 4, 5, 6A, 6B, 7A, 7B and 7C are flow charts showing the operation of the circuit shown in FIG. 2.
Figures 1, 3B:
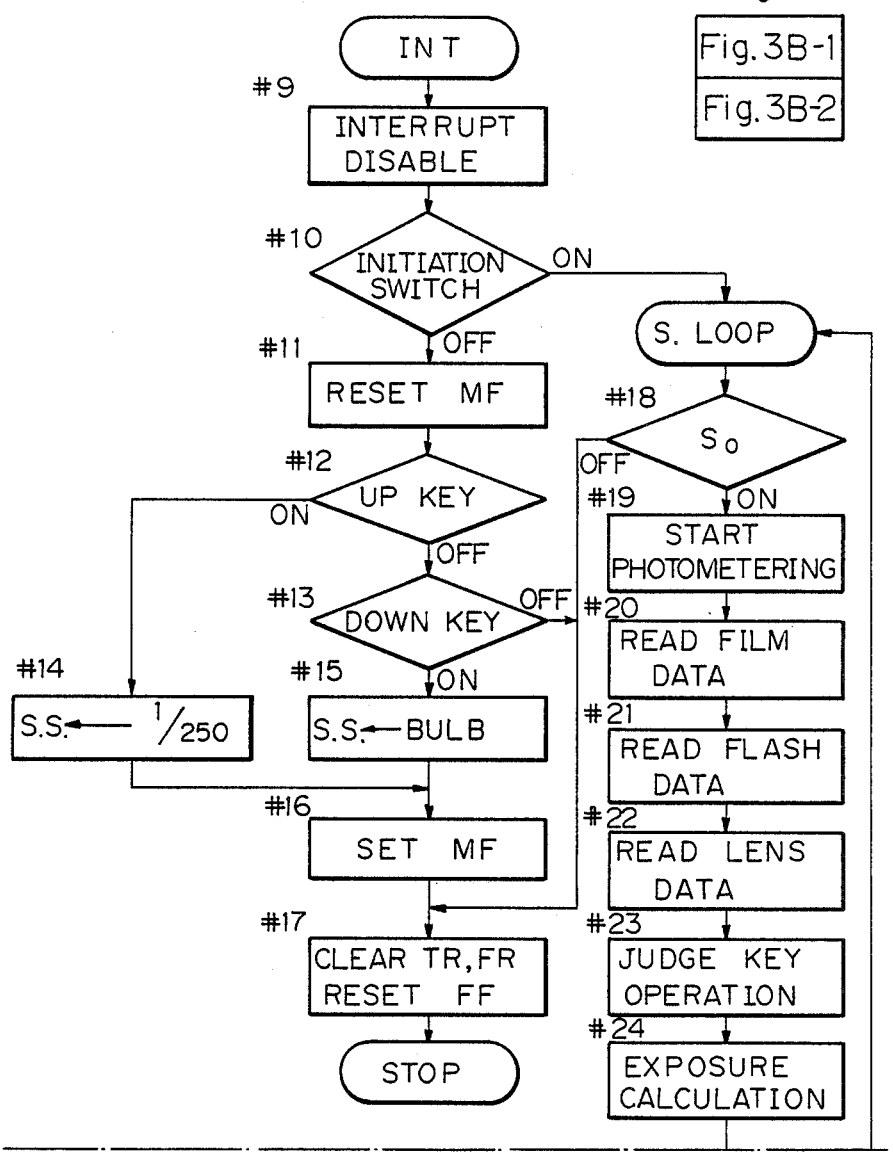
Figures 2, 3B:
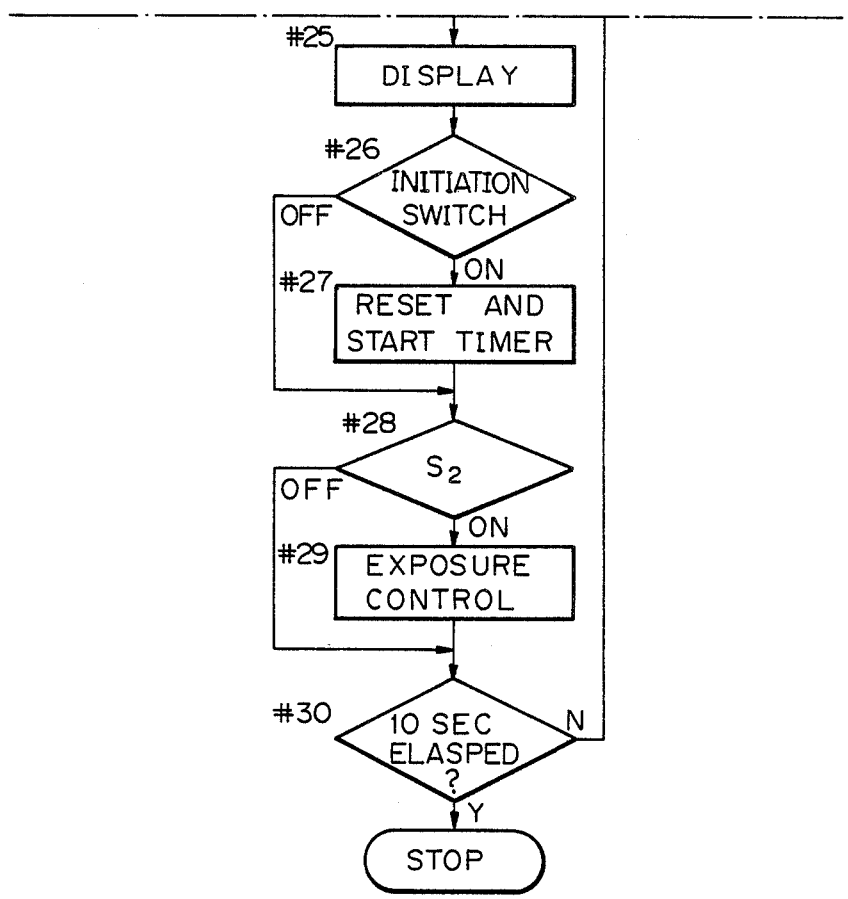

FIGS. 3A and 3B are flow charts showing the outline of the entire operation of the camera executed by the microcomputer shown in FIG. 2. A general operation will be described with reference to these flow charts.

Referring to FIG. 3A, when a power source 22 is charged in the camera body, the clear terminal $\overline{CLR}$ is momentarily reduced to a low level by a power-up clear circuit, and the microcomputer 11 executes a RESET routine. After an initial setting of the input and output ports and the RAM (#1), the microcomputer 11 then goes into a STOP routine. Since the microcomputer 11 goes to this routine also after the light measurement hold operation described hereinafter, the light measurement operation is first stopped (#2) and an interrupt is allowed by maintaining the output port $OP_0$ at a high level (#3). Then an AE lock flag AF is reset and an -attachment flag NF is set (#4). The flag AF is set at the time of an AE lock and the flag NF is set when the electronic flash device 20 is not attached to the accessory shoe 8 of the camera body 1. Note, even if the AE lock switch 6 is set at the "AEL" position, the light measurement circuit 13 is always made to perform a light measurement operation by the procedures of this step #4.

Then, a manual flag MF is discriminated to detect whether the camera is set in the program mode or the manual mode. The manual flag MF is set to indicate that the manual mode is set when the main switch $S_0$ is closed and one of the switches $S_u$ and $S_d$ is closed. Accordingly, when this manual flag is set, the subsequent exposure control of the camera is made in the manual mode.

Figure 13:
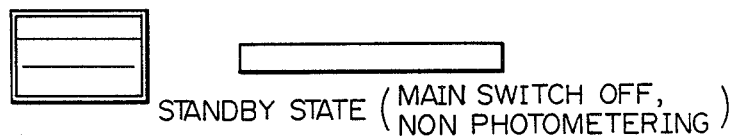
Figure 14:
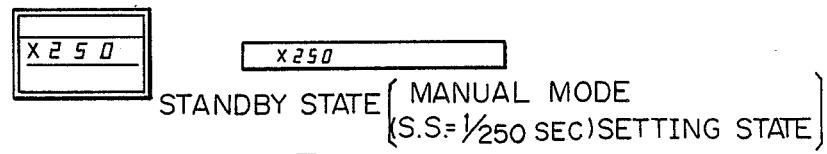
Figure 15:
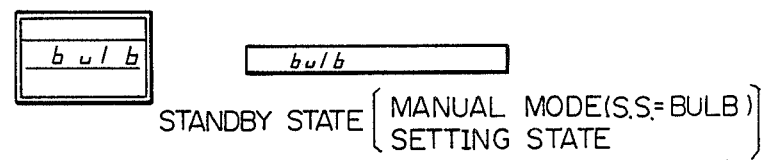

When the manual flag MF is set, only the shutter speed is displayed as shown in FIG. 14 or FIG. 15 (#7), but when the manual flag MF is reset, the display parts 7 and 18 perform the stand-by display shown in FIG. 13 (#6). The microcomputer then stops the operation (#8). Note, by changing the display state according to the state of the manual flag MF, even if the light measurement (the light measurement switch $S_1$ is turned ON and the light measurement circuit 13 is operated) operation is not carried out, the user can easily determine whether the camera is in the automatic mode or in the manual mode. The specific display states thereof are described hereinafter.

When the main switch $S_0$ of the camera is closed, the interrupt terminal $\overline{INT}$ of the microcomputer 11 is momentarily reduced to a low level by the one-shot circuit 21 shown in FIG. 2, and the microcomputer 11 executes the INT routine shown in FIG. 3B. In the INT routine, by maintaining the output terminal $OP_0$ at a low level, a subsequent interruption is inhibited (#9) to prevent other interruptions during the execution of the INT routine.

Then, it is determined by the level of the input terminal $IP_1$, whether or not all of the switches $S_1$, $S_2$, and $S_a$ are open (#10). When all of the switches $S_1$, $S_2$, and $S_a$ are open, the microcomputer goes to step #11 to reset the manual flag MF, and it is determined whether or not the manual mode is selected by detecting the state of the up-key and down-key switches $S_u$ and $S_d$ (#12 and #13). When the switch $S_u$ is closed, the shutter speed is set at 1/250 second (#14) and the manual flag MF is set (#16). When the switch $S_d$ is closed, the shutter speed is set at bulb exposure (#15) and the manual flag MF is set (#16). After the manual flag MF is thus set, the shutter speed is fixed at the set value of 1/250 second or bulb exposure, and the diaphragm aperture value then can be set or changed according to the operation of the up-key 4 or down-key 5.

On the other hand, where all of the switches $S_u$ and $S_d$ are open, the manual flag MF is reset and the microcomputer 11 goes to step #17. At step #17, the contents of a register PR and a register FR are cleared and the flash mode flag FF is reset. The program shift quantities at the P mode and the FP mode, that is, the P shift quantity and FP shift quantity, are stored in the registers PR and FR, respectively. The flag FF is set when the automatic mode is released at the time of flash photography and the mode is changed to that wherein the diaphragm aperture value can be manually set (hereinafter referred to as FL manual mode). Namely, by closing the main switch $S_0$, the P shift quantity, the FP shift quantity, and the FL manual mode are all released. The microcomputer 11 then goes to the STOP routine and stops the operation.

The program mode is executed according to the following procedures.

When an interrupt occurs in response to the closure of one of the light measurement switch $S_1$, the release switch $S_2$, and the AE lock switch $S_a$ while the STOP routine of the microcomputer 11 is in execution or the microcomputer 11 is stopped, the microcomputer 11 goes to the INT routine. Note, hereinafter these switches $S_1$, $S_2$, and $S_a$ are collectively referred to as "initiation switches". Where the INT routine is executed by one of these initiation switches, since the input terminal $IP_1$ is maintained at a low level (#10), the microcomputer goes to the S.LOOP routine. In the S.LOOP routine, the level of the input terminal $IP_0$ is discriminated to detect whether or not the main switch $S_0$ is closed (#18). When the main switch $S_0$ is open, the microcomputer goes to the above-mentioned step #17 to clear the P shift quantity and the FP shift quantity, and reset the FL manual mode, since the camera is not in the operating state. Thus, the STOP routine is executed and the microcomputer operation is stopped.

On the other hand, if the main switch $S_0$ is closed, the light measurement operation is started (#19). The light measurement circuit 13 performs an A/D conversion of the SPOT value and AVE value at every 250 ms (the time required for the A/D conversion is, for example, 15 ms), and the A/D converted values are stored in the internal output register. Furthermore, the film data is read out from the DX code of the film cartridge. If there is no DX code, the IS value is set at 100 (#20). Then, flash data indicating attachment of the flash device 20 to the camera body and a completion of charging is read out from the flash device 20 (#21), and lens data such as a fully open diaphragm aperture value $A_{v0}$ and a minimum opening diaphragm aperture value $A_{vmax}$ is read out from the lens circuit 19 (#22), and a discrimination of the operation status of the up-key and down-key switches $S_u$ and $S_d$ is effected (#23). Based on this data, the exposure calculation is carried out to determine the shutter speed and diaphragm aperture value (#24), and calculated data is displayed in the display part (#25).

Then, the level of the input terminal $IP_1$ is discriminated to detect whether or not the initiation switches are closed (#26). If any of the initiation switches are closed, a timer is reset, the time counting operation is started again (#27), and the microcomputer goes to step #28. If all of the initiation switches are open, the microcomputer goes immediately to step #28. The timer is provided to detect the light measurement hold, and is constructed so that when 10 seconds have passed from the point at which all of the initiation switches are open, the light measurement operation by the light measurement circuit 13 and the display by the display part are stopped, and the microcomputer operation is also stopped.

If the release switch $S_2$ is closed at step #28, the exposure calculation is performed based on the shutter speed and diaphragm aperture value determined at step #24 (step #29), and the time counting state of the timer is determined (#30). If the switch $S_2$ is open, the microcomputer goes straight to the above-mentioned step #30. If 10 seconds have not passed, the above-mentioned S.LOOP routine is repeated. On the other hand, if 10 seconds have passed (that is, where the light measurement hold has been terminated), the microcomputer goes to the STOP routine and the operation thereof is stopped. At the time of termination of the light measurement hold, unlike at the time of opening of the main switch $S_0$, the microcomputer does not execute the operation of step #17, and therefore, the P shift quantity, the FP shift quantity, and the FL manual mode are not released.

The above operation of the present embodiment will now be described in detail.

Figure 4B:
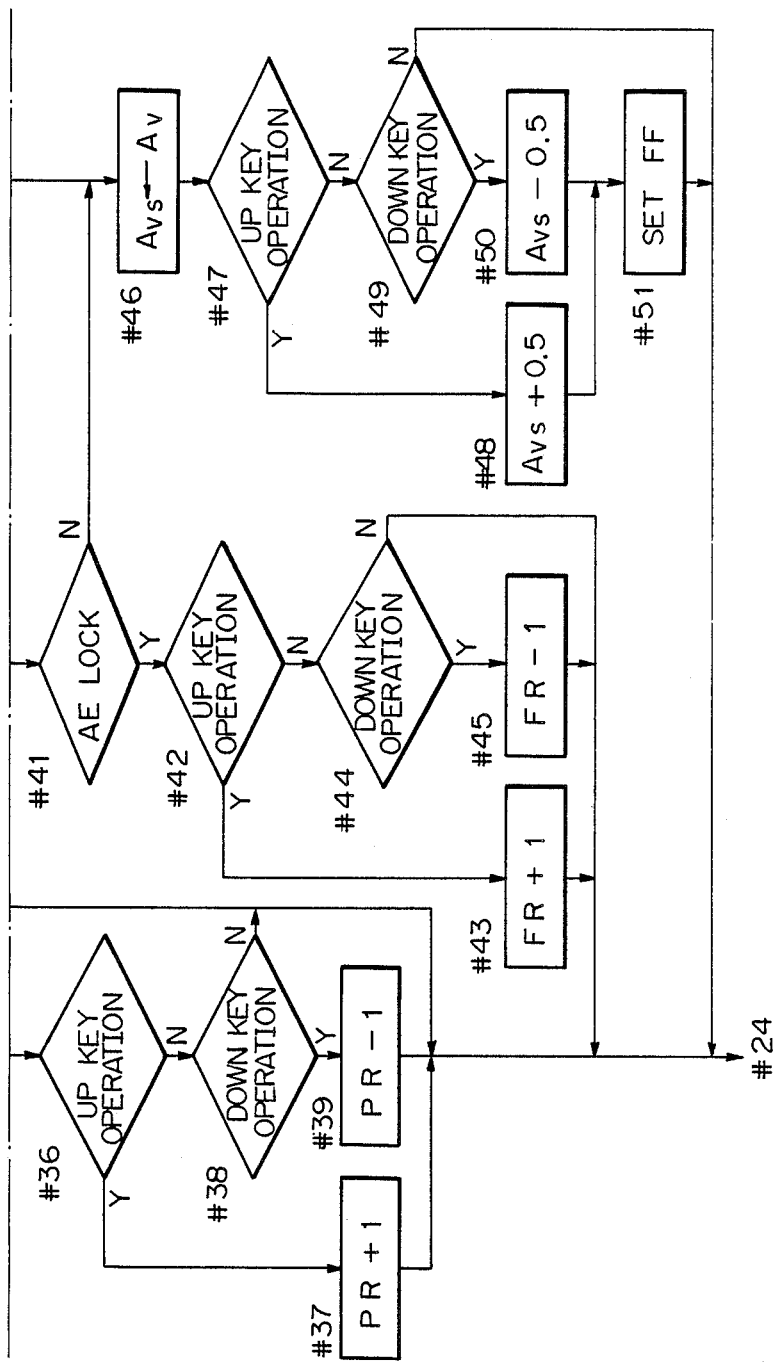

FIGS. 4A and 4B illustrate in detail the step #22 of reading the lens data and the step #23 of discriminating the status of the up-key and down-key, shown in the flow chart of FIG. 3B. First, the lens data such as the fully open diaphragm aperture value $A_{v0}$ and minimum opening diaphragm aperture value $A_{vmax}$ is read from the lens (#31), and the presence or absence of lens data is determined (#32). If lens data is not read, for example, if a lens is not attached to the camera, or a lens not giving lens data is attached to the camera, the microcomputer goes to step #33. At step #33, each value of $A_{v0}$ and $A_{vmax}$ is set at "0", the registers PR and FR are cleared, and an exposure calculation of the actual diaphragm aperture is carried out as described hereinafter. Note, the P shift quantity and FP shift quantity are cleared when the lens is removed from the camera body (the lens data disappears).

On the other hand, when lens data is available, the microcomputer goes to the KEY JUDGMENT routine wherein, first, the manual mode flag MF is detected (#34). When the manual mode flag MF is reset, attachment of the electronic flash device 20 is detected by determining the level at the input terminal $IP_9$ (#35). If the electronic flash device 20 is not attached, it is determined whether the up-key 4 or the down-key 5 is depressed (#36 and #38). Every time one of the keys is depressed, 1 is added to or subtracted from the register PR (#37 and #39), thus setting the P shift quantity at the P mode.

If the electronic flash device 20 is attached, the microcomputer goes to step #40, and the completion of charging state is detected by determining the level at the input terminal $IP_8$. If charging is not completed, the microcomputer goes immediately to step #24 shown in FIG. 3B, and the KEY JUDGMENT routine is not performed. Namely, when charging is not completed but the electronic flash device 20 is attached, the up-key 4 and down-key 5 do not function. On the other hand, if charging is completed, the AE lock flag AF is discriminated to detect whether or not an AE lock is effected (#41). If the AE lock is effected, depression of the up-key and down-key is detected (#42 and #44), and every time one of the keys is depressed, 1 is added to or subtracted from the register FR (#43 and #45), thus setting the FR shift quantity at the FP mode.

If an AE lock is not effected, for example, when there is no lens data or the manual mode flag MF is set, the microcomputer goes to step #46 to input the diaphragm aperture value to a register $A_{vs}$. Then depression of the up-key and down-key is detected (#47 and #49), and every time one of the keys is depressed, 0.5 $E_v$ is added to or subtracted from the content of the register $A_{vs}$ (#48 and #50) and the flash mode flag FF is set (#51). The diaphragm aperture value can be changed within the range of from the fully open diaphragm aperture value $A_{v0}$ to the minimum opening diaphragm aperture value $A_{vmax}$. If the diaphragm aperture value is smaller than $A_{v0}$ or larger than $A_{vmax}$, the content of the register $A_{vs}$ is fixed to $A_{v0}$ or $A_{vmax}$. If there is no lens data, the content of the register $A_{vs}$ is automatically set at 0. Accordingly, the diaphragm aperture values at the FL manual mode, at the manual mode, and in the absence of lens data are determined by the abovementioned process.

The exposure calculation routine of step #24, shown in FIG. 3B, will now be described in detail with reference to FIGS. 5, 6A and 6B.

In this exposure calculation routine, the exposure calculation in the P mode is based on the AVE value at the time of the shutter release, if the AE lock switch 6 is in the OFF position, or based on the SPOT value at the time of the AE lock when the AE lock switch 6 is in the AEL position. The exposure calculation in the FP mode is based on the AVE value at the time of shutter release when the AE lock switch 6 is in the OFF position, and on the AVE value at the time of AE lock when the AE lock switch 6 is in the AEL position.

First, attachment of the electronic flash device 20 is detected by determining the level at the input terminal $IP_9$ (#53). When the electronic flash device 20 is not attached, i.e., in the case of the daylight photography, the register FR is cleared and the flag FF is reset, the FP shift quantity and FL manual mode are released (#56), and the attachment flag NF is set to indicate a non-attachment of the electronic flash device 20 (#57). On the other hand, if the electronic flash device 20 is attached, i.e., in the case of flash photography, the register PR is cleared, and the P shift quantity is reset (#54).

Then, the flag NF is discriminated, and if the attachment has not been newly made, whether or not an AE lock is effected (#59) is determined by the AE lock flag AF. If an AE lock is not effected, both the AVE and SPOT values are read by the light measurement circuit 13, and the AVE value is input to a register R1 and the SPOT value is input to a register R2 (#60). If an AE lock is effected, the light measurement values are not input. Thus to cope with a shorter cycle at the S.LOOP routine, i.e., the cycle for reading the light measurement value is shorter than the light measurement cycle, both the AVE and SPOT values are repeatedly read. For example, if it becomes necessary to lock the SPOT value because the AE lock switch $S_a$ is closed, since both light measurements are always input, the light measurement is immediately selected and locked without waiting for the subsequent light measurement cycle, and the exposure calculation, display, and exposure control can be carried out based on this value.

On the other hand, if the flag NF is set at step #55, i.e., if the electronic flash device 20 is newly attached, the flag NF is reset to store the data showing the attachment of the electronic flash device 20 (#58), the routine goes immediately to step #60 without discrimination of the AE lock flag AF, and the light measurements are input. This operation is carried out because, if the electronic flash device 20 is attached while the AE lock is in operation, the photographic conditions are drastically changed from the conditions adopted, and thus the light measurement is executed again to prevent an introduction of the light measurement at the P mode into the FP mode.

If the AE lock switch $S_a$ remains closed, then the AE lock flag AF is set (#62), and if the AE lock switch $S_a$ is open, the register FR is cleared and the flag AF is reset (#63). At this point, one of the AVE and SPOT values is selectively adopted according to the attachment or non-attachment of the electronic flash device 20 or the presence or absence of the AE lock (#64 through #67). Namely, when the electronic flash device 20 is attached, the AVE value is adopted regardless of the presence or absence of the AE lock, and when the electronic flash device 20 is not attached (in the case of daylight photography), the SPOT value is adopted at the time of the AE lock and the AVE value is adopted at the time of the non-AE lock. Then, a metered manual register MR, which indicates a positive or negative value of the difference between the exposure value set at the manual mode and the proper exposure value, is cleared and the Fill-In flash flag FI at the FP mode is reset (#68).

The exposure value $E_v$ is then calculated at step #69. Namely, the light measurement data (brightness value) $B_v$ obtained at the above-mentioned step #66 or #67 is added to the film sensitivity data (speed value) $S_v$ obtained at step #20 shown in FIG. 3 to obtain an exposure value $E_v$ (#69). The exposure calculation mode is determined according to the presence or absence of the manual flag MF and the completion or noncompletion of charging of the electronic flash device 20 (#70 and #71). Namely, when the flag MF is set, the manual mode having the fixed time value $T_v$ and set aperture value $A_v$ is set, regardless of a completion or noncompletion of charging. When the flag MF is reset, the P mode is set if the charging is not completed, and the FP mode is set if the charging is completed.

Figure 6A:
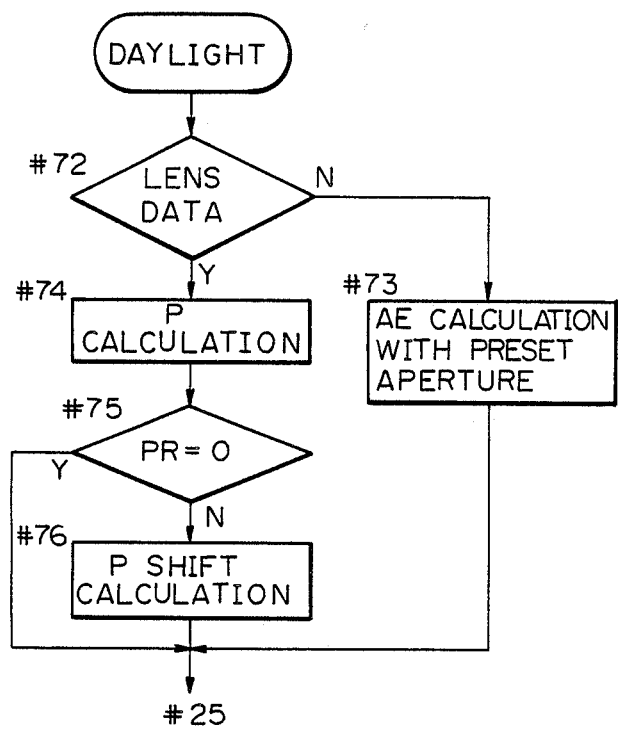

If the P mode is detected at step #71, the operation shown in FIG. 6A is executed. Referring to FIG. 6A, a presence or absence of lens data is detected (#72), and if there is no lens data, an AE calculation for determining the shutter speed is executed, based on the actual aperture of the lens (#73). In this case, the diaphragm aperture value is displayed as "--". On the other hand, if lens data is available, a program AE calculation at the P mode for calculating the shutter speed and diaphragm aperture value is executed according to the predetermined program line (#74). Note, if the content of the register PR is not "0", a program shift calculation for shifting the shutter speed and diaphragm aperture value from the calculated values is executed according to the content of the register PR (#76).

Figure 6B:
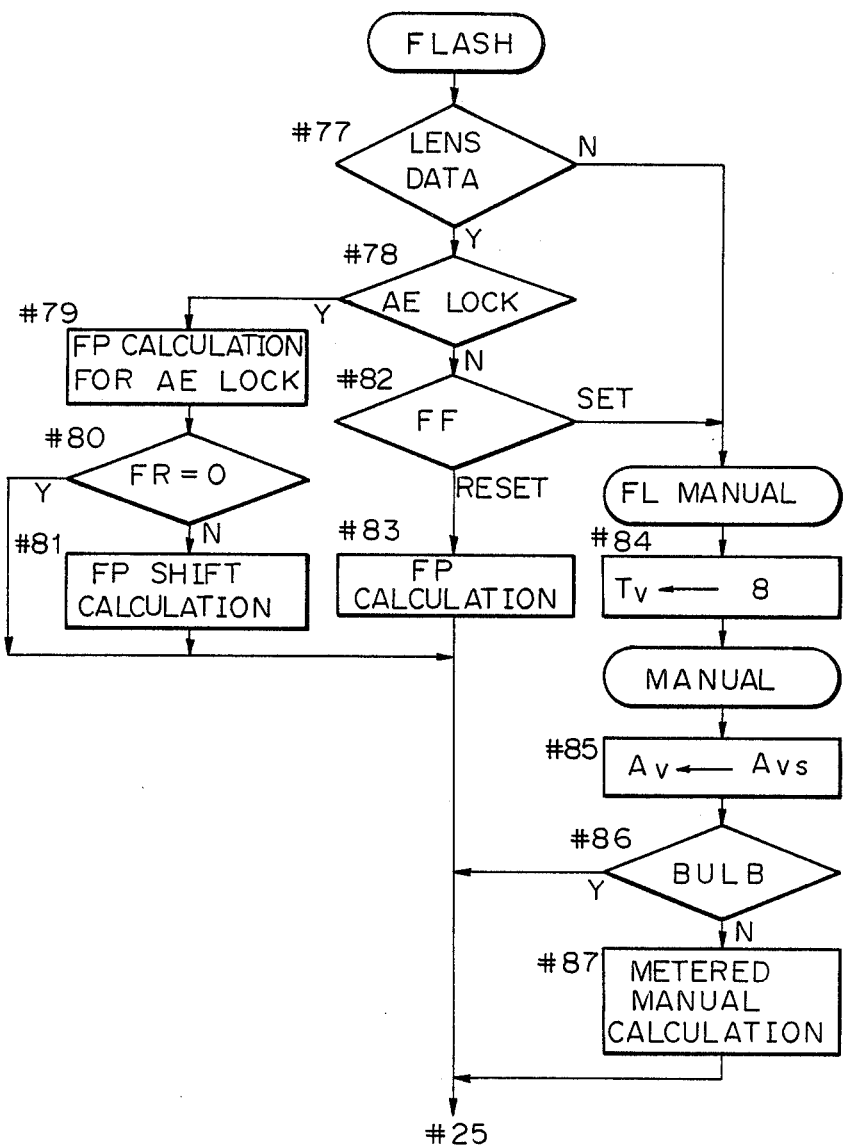

If the FP mode is detected at step #71, the operation shown in FIG. 6B is executed. Referring to FIG. 6B, first the calculation mode is determined according to the presence or absence of lens data, the presence or absence of an AE lock, and the status of the FL manual flag FF. Namely, where lens data is available and the AE lock is effected, a program AE operation for the FP mode (described in detail hereinafter), which is compatible with the AE lock, is executed to calculate the shutter speed and aperture value (#79), and if the content of the register FR is not "0", the shutter speed and aperture value are shifted based on the calculated values according to the content of the register FR (#81).

Figure 8:
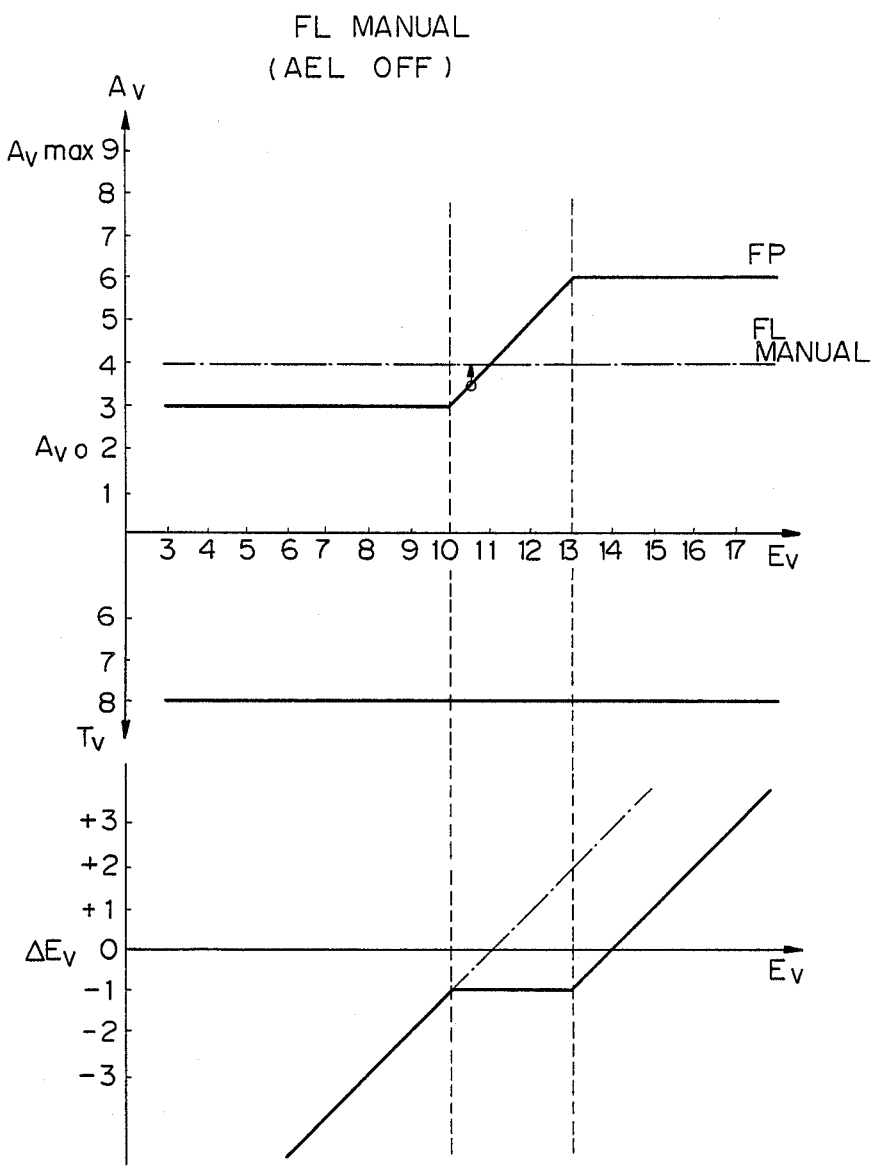
FIGS. 8 through 10 are program lines showing exposure control data at respective flash photography modes.

If lens data is available and the AE lock is not effected but the flag FF is reset, a program AE calculation for the FP mode is executed (#83). Note, where the flag FF is set, for example, when lens data is not available, the manual mode is set, the shutter speed is fixed to 1/250 second (#84), and the aperture value is fixed to the value set by the up-key 4 or down-key 5 (#85). The difference between the exposure value of this combination and the proper exposure value is calculated as the metered manual value (#87). The program line for the FL manual mode is shown in FIG. 8.

Figure 7A:
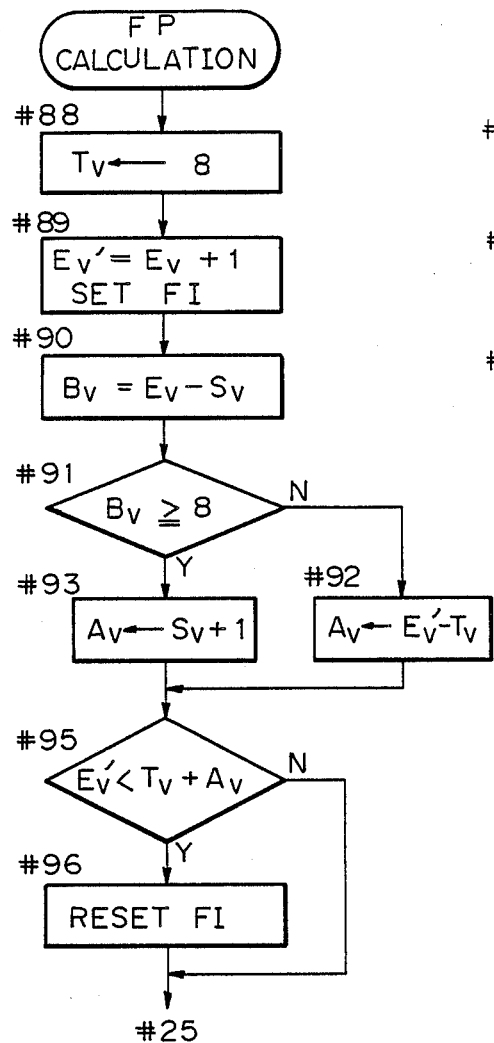

FIG. 7A illustrates in detail the program AE calculation for the FP mode at step #83 shown in FIG. 6B. This FP calculation is executed so that the shutter speed is fixed to the critical synchronizable shutter speed of 1/250 second ($T_v=8$) and the aperture value is set at the value obtained by subtracting 1 $E_v$ from the proper exposure value determined only by daylight.

Figure 9:
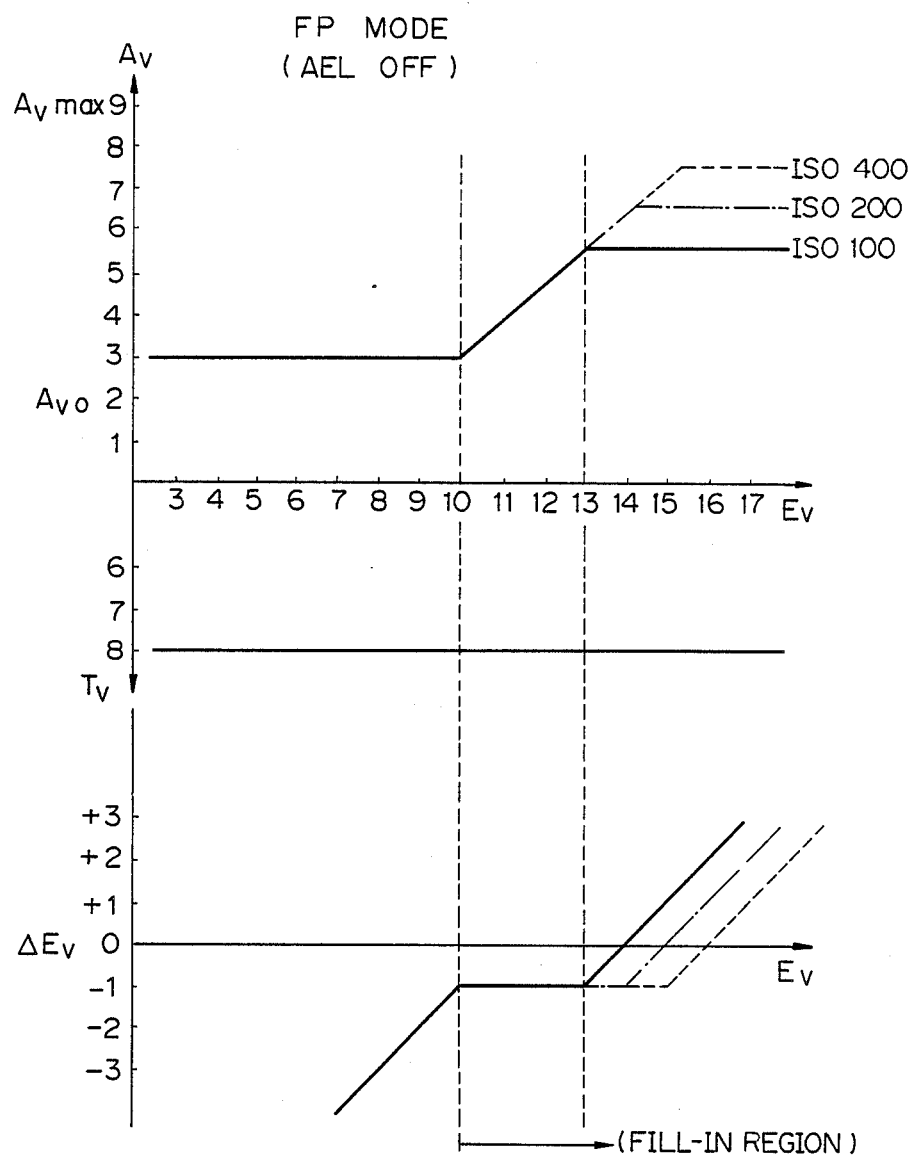

First, the shutter speed is fixed to 1/250 second (#88), and then 1 $E_v$ is added to the $E_v$ value obtained at step #69 to obtain an $E_v'$ value (#89). Simultaneously, the flag FI for the Fill-In flash is set. This calculation is carried out to deviate the amount of flash light emission from the proper value by addition or subtraction. The film speed value $S_v$ is then subtracted from $E_v$ (#90), and if the brightness value $B_v$ as the APEX value is larger than 8, the value obtained by adding 1 to $S_v$ is regarded as the aperture value $A_v$ (#93), and if $B_v$ is smaller than 8, the value obtained by subtracting the time value $T_v$ from $E_v'$ is adopted as $A_v$ (#92). Note, $A_v$ is determined within the range of from a larger value between the fully open aperture value $A_{v0}$ and F 2.8 to the minimum opening aperture value $A_{vmax}$ (for example, within the range of from F 2.8 to F 22). If $(T_v+A_v)$ is larger than $E_v'$ (smaller by at least 1 $E_v$ than the proper exposure value), the flag FI is reset. The shutter speed and aperture value at the FP mode are determined by the foregoing process, and FIG. 9 shows the program line for this FP mode. Note, in FIG. 9, the abscissa represents the $E_v$ value and the ordinate indicates the $A_v$ value, the $T_v$ value, and the $\Delta E_v$ value (the amount of deviation from the proper exposure level).

Figure 7B:
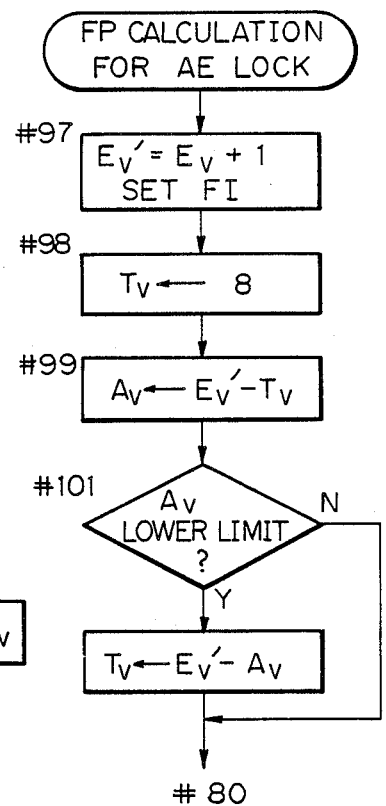

FIG. 7B illustrates details of the program AE calculation for the FP mode, which is compatible with the AE lock at step #79 in FIG. 6B. When the AE lock is effected in the FP mode, the shutter speed changes according to the brightness of the object to be photographed, and a so-called slow synchronism at a speed lower than 1/250 sec becomes possible. Accordingly, since the exposure by daylight can be maintained at a level higher than the level lower than the proper exposure value by 1 $E_v$, even at a low brightness, the exposure by Fill-In flash is attained at a full range of brightness. In this case, the ISO upper limitation of the aperture value is released.

Figure 5A:
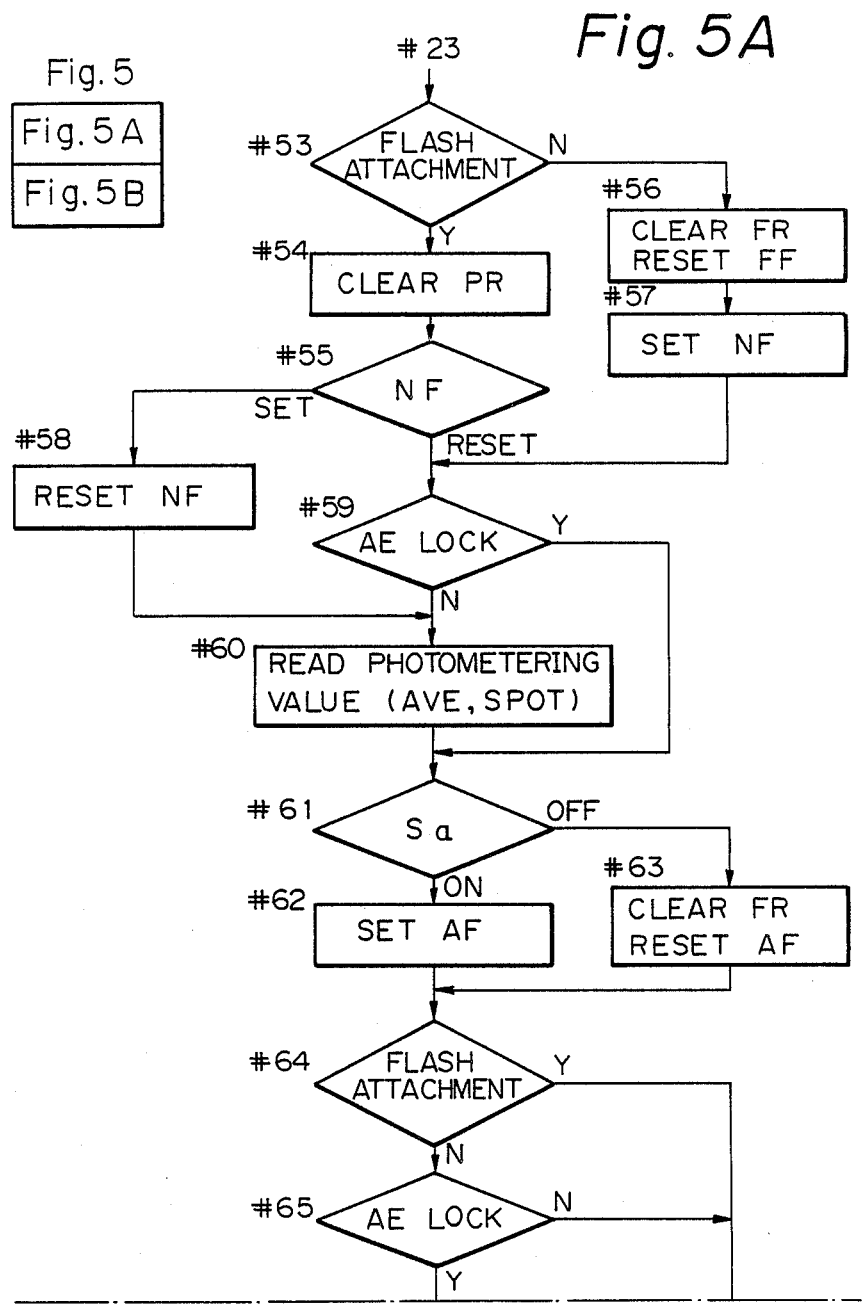
Figure 5B:
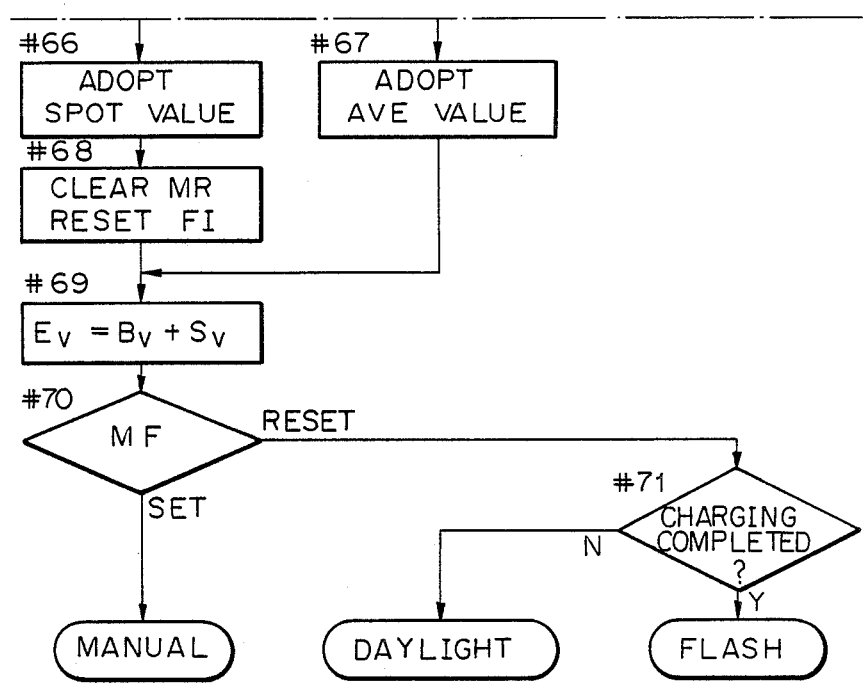
Figure 10:
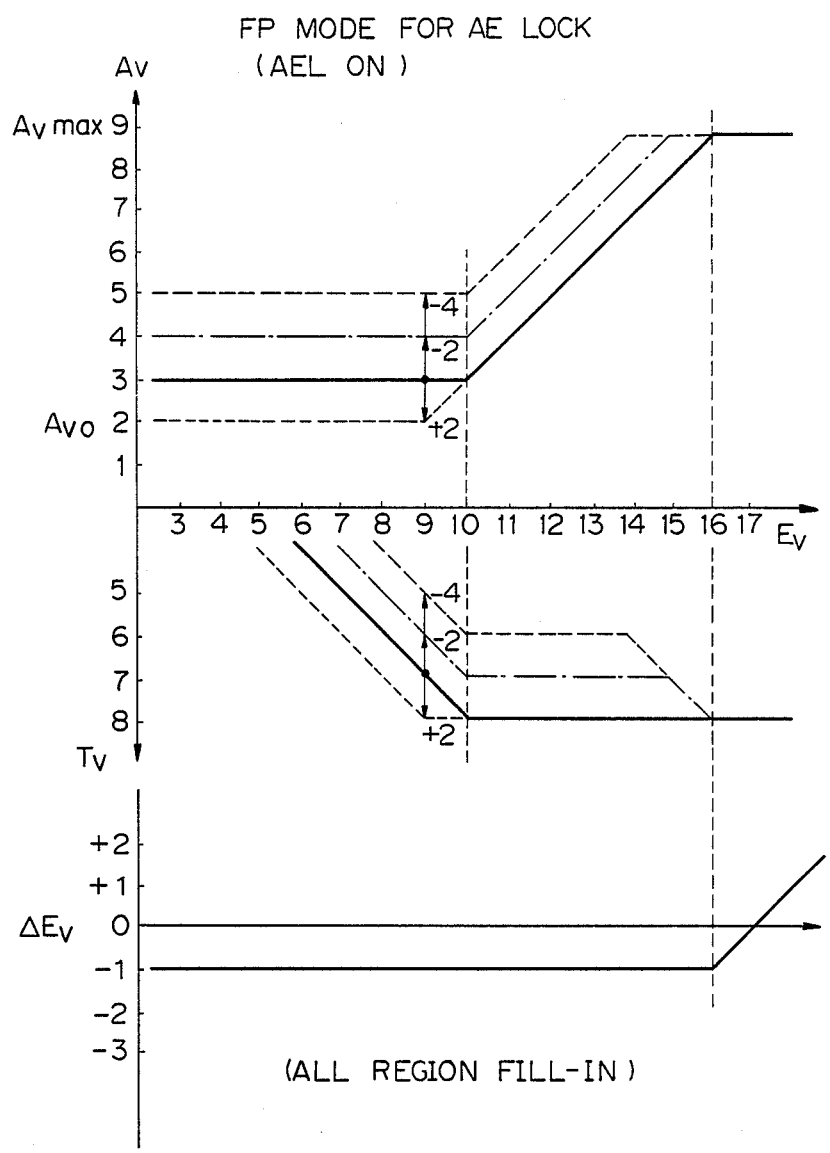

AT this FP calculation for the AE lock, first the flag FI is set and the value obtained by adding 1 to $E_v$ obtained at step #69 shown in FIG. 5 is adopted as $E_v$ (#97). Then the time value $T_v$ is set at 8 (1/250 second) (#98), and is subtracted from $E_v'$. The subtracted value is restricted within the range of from $A_{v0}$ to $A_{vmax}$ and is adopted as $A_v$ (#99). At this time, if $A_v$ is restricted by $A_{v0}$, the restricted $A_v$ is subtracted from $E_v'$, and the obtained value is adopted as $T_v$. The solid line of FIG. 10 shows the program line in the FP mode when the AE lock is effected. In FIG. 10, as in FIG. 9, the abscissa indicates the $E_v$ value and the ordinate indicates the $A_v$ value, the $T_v$ value, and the $\Delta E_v$ value.

Figures 2, 7C:
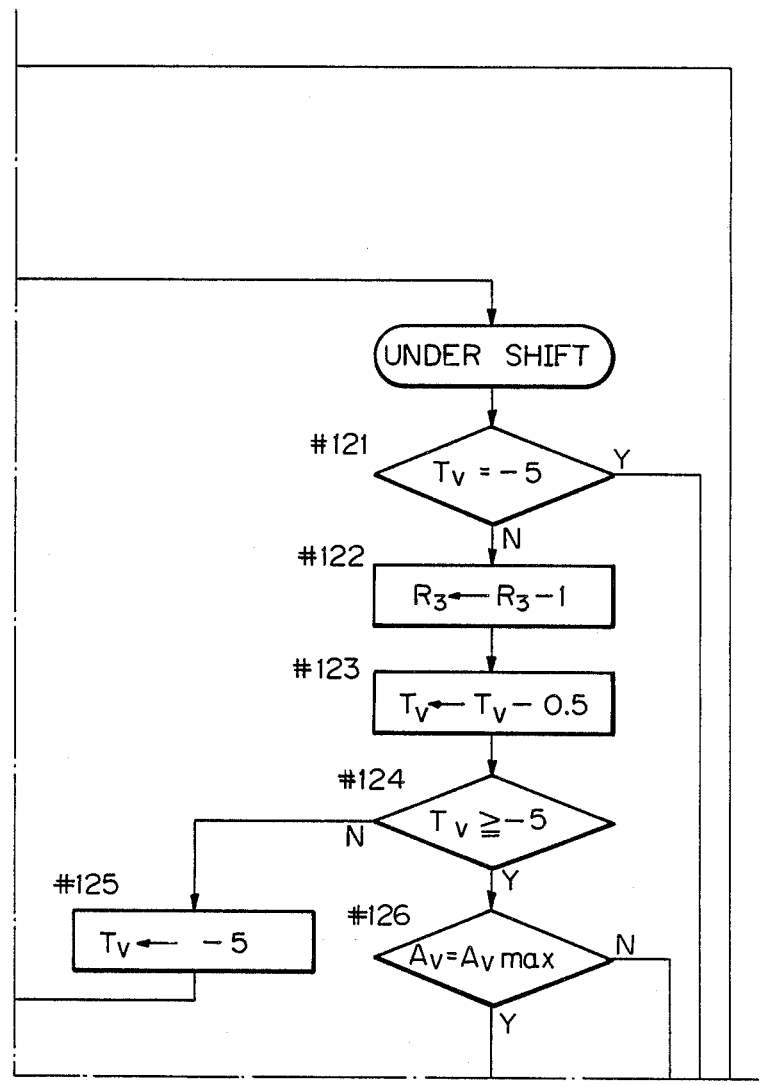
Figures 3, 7C:
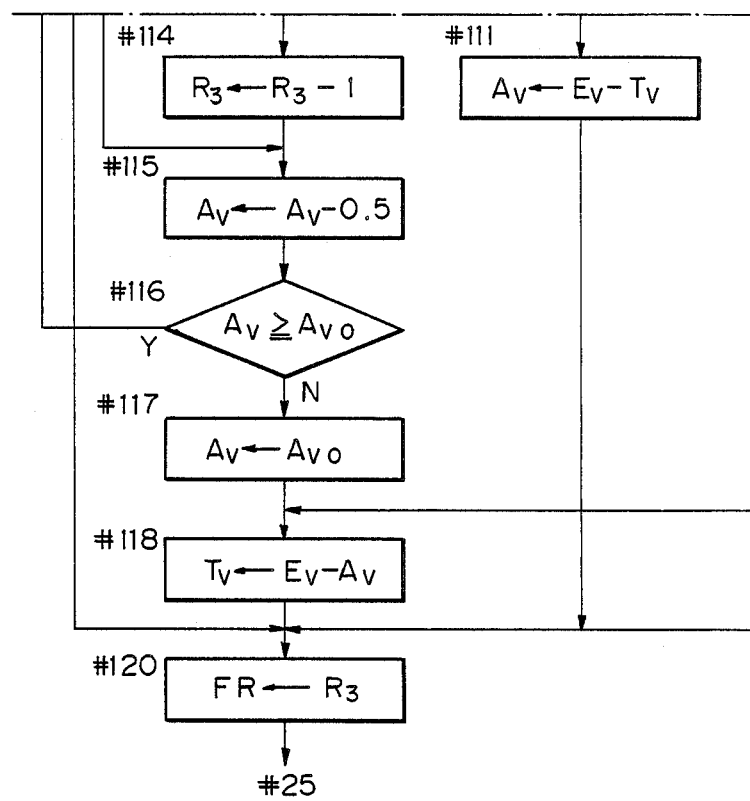
Figures 4, 7C:
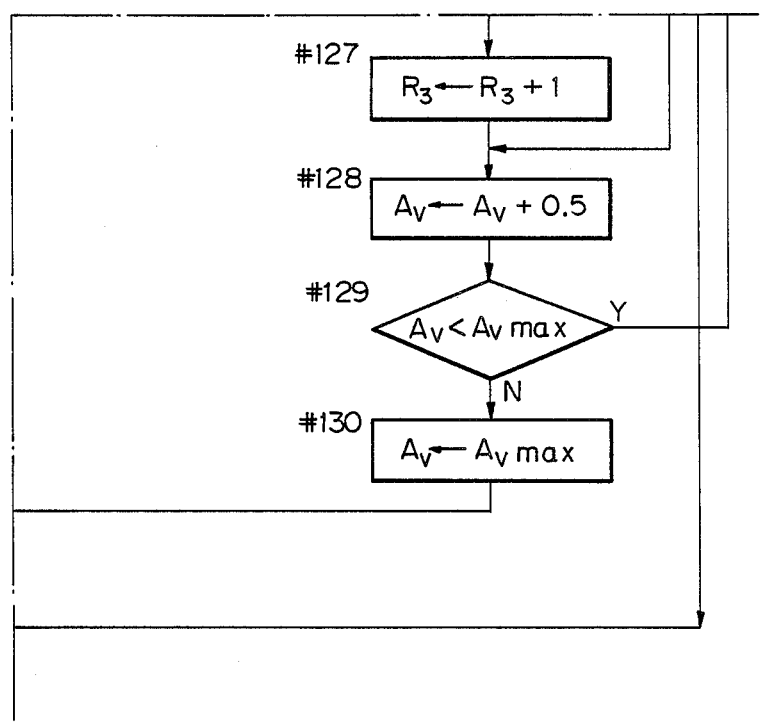

FIG. 7C illustrates in detail the FP shift calculation at step #81 shown in FIG. 6B. The term FP shift, as used herein, denotes a change of the combination of the $T_v$ and $A_v$ values obtained at the abovementioned calculation for the AE lock based on a set shift quantity, while keeping $(T_v+A_v)$ constant. The change of the program line caused by the FP shift is shown by a broken line or one-dot chain line other than the solid line in FIG. 10. The FP shift will now be described in detail. First, the content of a register R3 for calculating the amount of shift is cleared to 0 (#103). Then, the content of the register R3 is compared with the register FR in which the desired amount of shift is manually set (#104), and it is determined whether or not the calculated amount of shift is equal to the set amount of shift corresponding to the content of the register FR. When the content of the register R3 is in agreement with the content of the register FR, it is determined that the shift has been executed at a predetermined amount, and accordingly, the routine goes to step #120 and the FP shift is terminated.

If the calculated shift amount is not equal to the above-mentioned shift amount, the shift is continued according to the following procedures. Namely, it is determined whether the content of the register FR is positive or negative (#105). If the content is positive, the process goes to an overshift routine, and if the content is negative, the process goes to an undershift routine. The overshift routine is a shift routine for increasing $T_v$ and decreasing $A_v$. If the shutter speed is higher than the flash synchronizable limit shutter speed of 1/250 second, a shift to a higher speed makes it impossible for the electronic flash to effect synchronous flashing. Accordingly, the routine goes to step #120 and the shift is terminated. On the other hand, if the shutter speed is a low speed below 1/250 second, 1 is added to the content of the register R3 (#107) and a shift quantity of 0.5 is added to $T_v$ (#105). At this time, if the shutter speed is higher than 1/250 second, the shutter speed is fixed to 1/250 second (#110), $A_v$ is calculated by subtracting $T_v$ from $E_v$ (#111), and $A_v$ is restricted within the range of from $A_{v0}$ to $A_{vmax}$. The routine then goes to step #120 and the shift is terminated. If the shifted shutter speed is lower than 1/250 second, it is determined whether the aperture value is $A_{v0}$ (that is, the fully open aperture value) (#113). If the aperture value is the fully open aperture value, 1 is subtracted from the content of the register R3 (#114). Since $A_v$ has been made equal to the fully open diaphragm aperture value, by overshifting, and cannot be shifted further to the fully open side, 1 is subtracted from the calculated shift amount. Then 0.5 $E_v$ is subtracted from $A_v$ (#115), and if the obtained shifted $A_v$ value is larger than $A_{v0}$, the routine returns to step #104 and the shift is again conducted. If the shifted $A_v$ value is smaller than $A_{v0}$, $A_v$ is fixed to $A_{v0}$ (#117), and $A_v$ is subtracted from $E_v$ to calculate $T_v$ (#118). The $T_v$ value is then restricted within the range of from 30 seconds to 1/250 second, the routine goes to step #120, and the shift is terminated. Note, in FIG. 10, the broken line indicates the state where overshifting is executed twice.

The undershift routine is a shift routine for decreasing $T_v$ and increasing $A_v$. If $T_v$ is a speed lower than 30 seconds, since it is impossible to shift $T_v$ to a lower speed, the routine goes to step #120 and the shift is terminated. On the other hand, if $T_v$ is a speed higher than 30 seconds, 1 is subtracted from the content of the register R3 (#122) and 0.5 $E_v$ is subtracted from $T_v$. If $T_v$ is made lower than 30 seconds by this calculation (#124), $T_v$ is fixed to 30 seconds (#125), and $T_v$ is subtracted from $E_v$ to calculate $A_v$ (#111). The $A_v$ is then restricted within the range of from $A_{v0}$ to $A_{vmax}$, the routine goes to step #120, and the shift is terminated.

If $T_v$ is higher than 30 seconds after the above calculation, it is determined whether or not $A_v$ is $A_{vmax}$ (that is, the minimum opening aperture value) (#126). If $A_v$ is equal to $A_{vmax}$, 1 is added to the register R3 (#127), since $A_v$ has been made equal to the minimum opening, by undershifting, and a further reduction is impossible, 1 is added to the calculated shift amount, and a shift quantity of 0.5 $E_v$ is then added to the $A_v$ (#128). If the obtained shifted $A_v$ is smaller than $A_{max}$, since a further shift is possible, the routine returns to the above-mentioned step #104 and a shift is conducted.

If the $A_v$ shifted at step #128 is larger than $A_{vmax}$, $A_v$ is fixed to $A_{vmax}$ (#130). $A_v$ is then subtracted from $E_v$ to calculate $T_v$ (#118), $T_v$ is restricted within the range of from 30 seconds to 1/250 second, and the routine goes to step #120. Thus, the shift is terminated. Note, the one-dot chain line in FIG. 10 indicates the state wherein undershifting is conducted twice.

At step #120, the content of the register R3 is stored in the register FR. This is because if the shift amount is restricted due to a variation of the brightness of the object during the shift, the content of the register FR is replaced by the restricted shift amount. If the shift in the reverse direction is performed, $T_v$ and $A_v$ are immediately changed to enable a faster response to operation of the up-key or down-key.

Figure 11:
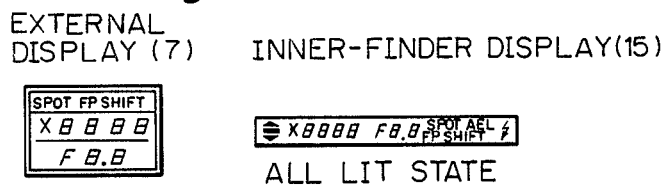

FIG. 11 illustrates the all lit state of the external display part 7 and the inner-finder display part 15 in the present embodiment, and FIG. 12 illustrates the all non-lit state caused by the opening of the main switch $S_0$. FIGS. 13 through 15 illustrate the stand-by state (where the main switch $S_0$ is closed but the light measurement is not yet executed). FIG. 14 illustrates the state where the main switch $S_0$ is closed and the up-key switch $S_u$ is closed, and FIG. 15 illustrates the state where the main switch $S_0$ is closed and the down-key switch $S_d$ is closed. Note, even in the stand-by state, the shutter speed is displayed to indicate that the manual mode is set.

FIG. 16 shows displays in the respective modes during the light measurement operation. Note, even if the AE lock switch $S_a$ is closed while the electronic flash device is attached, the SPOT display does not appear; indicating that the automatic exposure control is performed based on the AVE value. When the up-key switch or down-key switch is closed when the charging of the electronic flash device is completed (that is, at FL manual), or when the shutter speed is set at 1/250 second in the manual mode, the metered manual is displayed by the symbol . The data displayed in FIG. 16 is fed in time series to the display control circuit 15, and the $T_v$, $A_v$, and metered manual symbol are displayed. Furthermore, signals indicating the ! light measurement mode, calculation mode, exposure control mode, and completion of charging are fed to the display control circuit 15, and these modes and a completion of charging are displayed. This operation is executed at step #25 in FIG. 3, but a detailed flow thereof is omitted since it is obvious to persons with ordinary skill in the art.

Figure 17:
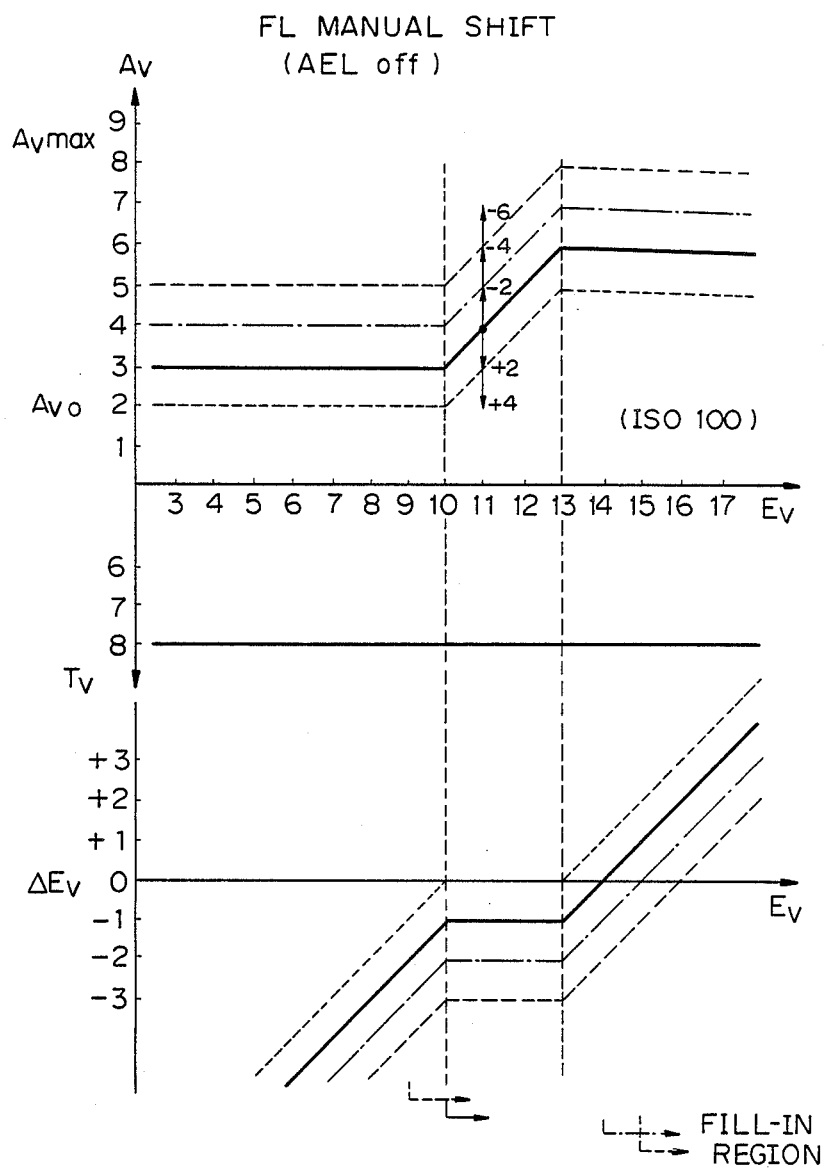
FIG. 17 is a program line showing exposure control data at another flash photography mode.

In the present embodiment, an FL manual mode is adopted in which $T_v$ is set to 1/250 second and $A_v$ becomes the set value when the up-key switch or down-key switch is closed while the AE lock switch is opened and charging of th electronic flash is completed. The present invention is not, however, limited to this embodiment. For example, a modification may be adopted in which $T_v$ is fixed to 1/250 second and $A_v$ is set at a value obtained from $B_v$ and $S_v$ by FP calculation, and then shifted by a shift quantity determined by the up-key switch or down-key switch. The program line at this FL manual shift is shown in FIG. 17. At this time, $A_v$ is changed according to the brightness of the object to be photographed, and this $A_v$ is changed, by a preset amount of shift, from the $A_v$ determined by the FP calculation over all brightness values.

In the boundary area in the program line where a changeover is made from the Fill-In region to the normal region, i.e., non-Fill-In region, the Fill-In region can be broadened so that when the diaphragm aperture value reaches the limit thereof, the shutter speed is changed from 1/250 second to a lower speed according to the brightness, and the aperture value and shutter speed are fixed to F 2.8 and 1/60 second at a brightness lower than the brightness at which the shutter speed is 1/60.

Although a preferred embodiment of the present invention has been described, various modifications and alternations are possible within the scope of the present invention.

Figure 18:
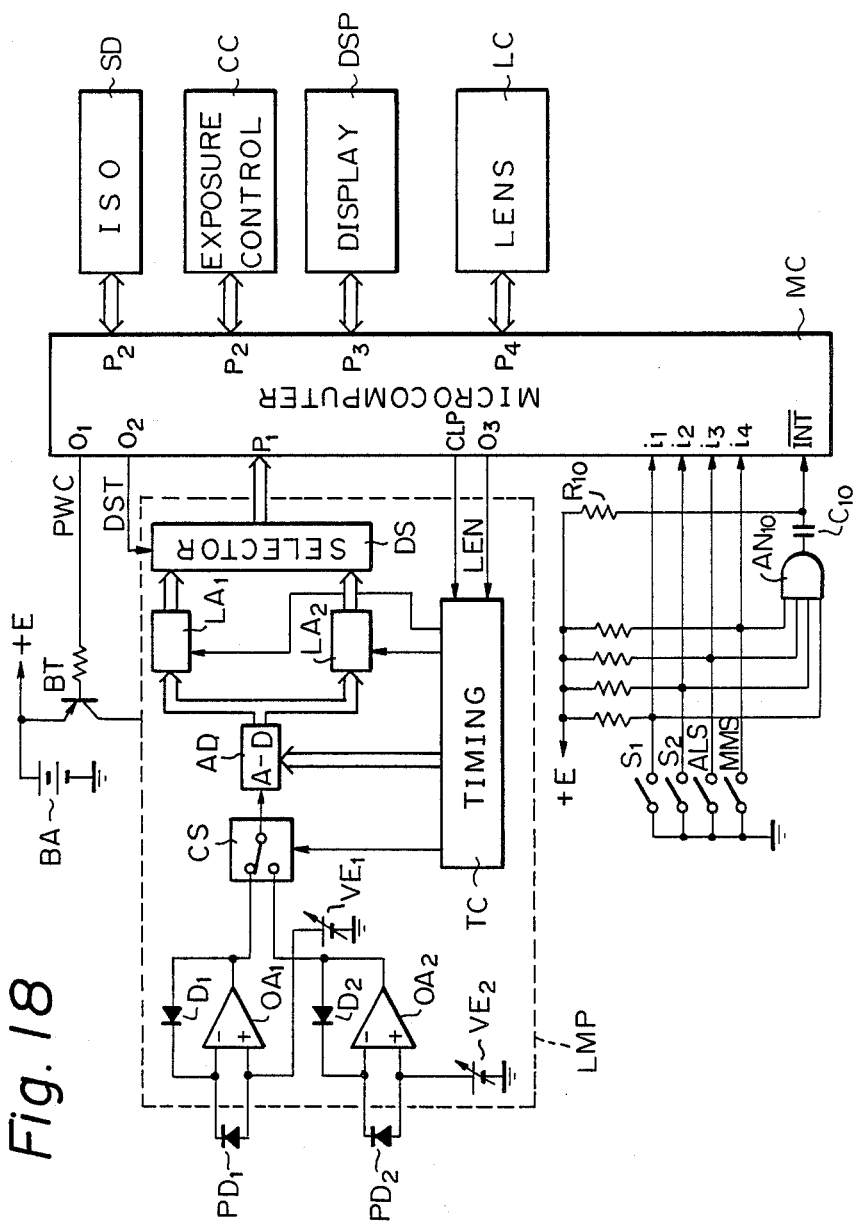
FIG. 18 is a block diagram illustrating a circuit in another embodiment of the present invention.

For example, although slide switches are used as the main switch and AE lock switch in the above-mentioned embodiment, a modification may be adopted in which push button type switches are used instead of the above slide switches, and the mode is changed every time the push buttons are depressed. FIG. 18 is a block diagram illustrating another embodiment of the present invention, having this structure. In FIG. 18, a light measurement switch $S_1$ is closed by depressing a release button (not shown) to a first step and a release switch $S_2$ is closed by depressing the release button to a second step. An AE lock switch ALS is changed from the AE lock mode to the normal mode (non-AE lock mode), or vice versa, by operating a manual operation member (not shown) every time the switch ALS is closed, and a light measuring mode switch MMS is changed from the average light measuring mode to the spot light measuring mode, or vice versa, by operating a manual operating member (not shown) every time the switch MMS is closed. These switches are connected to input terminals $i_1$, $i_2$, $i_3$, and $i_4$ of a microcomputer MC, and the switches are also connected to an input terminal of an AND circuit AN$_{10}$. The output of the AND circuit AN$_{10}$ is connected to an interrupt terminal $\overline{INT}$ of the microcomputer MC through a differential circuit comprising a capacitor C10 and a resistor R10. Accordingly, if any of the switches S$_1$, S$_2$, ALS, and MMS are closed, a pulse is input to the interrupt terminal $\overline{INT}$ and the microcomputer MC is started by this interrupting pulse.

A light measurement circuit LMP and light receiving elements PD1 and PD2 are arranged at a position where they can receive light from an object to be photographed, which light has passed through a camera lens (not shown). The light receiving region of each light receiving element is designed, as shown in FIG. 19, in such a manner that the element PD1 is located in the central portion to output a signal B$_{v1}$ representing the spot light measurement, and the element PD2 is located in the region surrounding the central spot light measurement region to output a signal B$_{v2}$ representing the surrounding light measurement. In the spot light measurement mode, the light measurement B$_{v1}$ measured by the light receiving element PD1 is utilized for the exposure calculation, and in the average light measurement mode, the average value (BV1+BV2)/2 of the outputs BV1 and BV2 of the light receiving elements PD1 and PD2 is used for the exposure calculation.

An output BV1 obtained by logarithmic compression of the output current of the element PD1 is output from an operational amplifier OA1, and an output BV2 obtained by logarithmic compression of the output current of the element PD2 is output from an operational amplifier OA2. Note, since the light receiving elements PD1 and PD2 perform TTL light measurements with a fully open diaphragm aperture, if, for example, the fully open aperture value of the lens is A$_{v0}$, the respective outputs are B$_{v1}$−A$_{v0}$ and B$_{v2}$−A$_{v0}$. The data A$_{v0}$, however, is obtained as the lens data, and B$_{v1}$ and B$_{v2}$ are obtained by adding the data A$_{v0}$ to the above-mentioned light measurements. Therefore, in the description given hereinafter, A$_{v0}$ is neglected. Voltage sources VE$_1$ and VE$_2$ output voltages for adjusting the photometric outputs, and a changeover circuit CS changes the outputs of the operational amplifiers OA1 and OA2 and feeds them to an A/D converter AD. The A/D converter AD converts an analog signal from the changeover circuit CS to a digital value. Upon termination of the A/D conversion of the photometric output B$_{v1}$, a latch circuit LA1 latches the output of the A/D converter AD, and upon termination of the A/D conversion of the photometric output B$_{v2}$, a latch circuit LA2 latches the output of the A/D converter AD. When an output line (DST) from a terminal 02 of the microcomputer MC is at a high level, a data selector DS outputs the output B$_{v1}$ of the latch circuit LA1 to a port P1, and when the output line DST is at a low level, the data selector DS outputs the output B$_{v2}$ of the latch circuit LA2 to the port P1. A timing control circuit TC is actuated when an output line LEN from a terminal 03 of the microcomputer MC is at a low level, and the control circuit TC outputs a control signal to each of the circuits of the light measurement circuit LMP based on a clock pulse CLP from the microcomputer MC. This control circuit TC first sets the changeover circuit CS to the state where the output of the operational amplifier OA1 is input to the A/D converter AD and the control circuit TC starts the A/D conversion. Upon termination of the A/D conversion, the control circuit TC transmits a latch pulse to the latch circuit LA1 to latch B$_{v1}$ to the latch circuit LA1. The control circuit TC then sets the changeover circuit CS to the state wherein the output of the operational amplifier OA2 is input to the A/D converter AD and the control circuit TC starts the A/D converter AD. Upon termination of the A/D conversion, the control circuit TC transmits a latch pulse to the latch circuit LA2 to latch B$_{v2}$ to the latch circuit LA2. If the foregoing operation is performed at a cycle of 250 ms, the contents of the latch circuits LA1 and LA2 are renewed at a cycle of 250 ms. A feeding transistor BT is ON/OFF controlled by an output terminal PWC of the microcomputer MC, and when the transistor BT is turned ON, the transistor BT supplies power to the light measurement circuit LMP from a battery BA. This transistor BT is turned ON while the light measurement switch S$_1$ is closed and remains ON for 10 seconds from the time when the light measurement switch S$_1$ is opened. Note, the light measurement circuit 13 shown in FIG. 2 has the same structure as that of the light measurement circuit LMP shown in FIG. 18.

A film sensitivity output circuit SD reads out ISO data formed on a film cartridge and outputs the ISO data to a port P2; an exposure control circuit CC performs the exposure control operation based on the aperture value and shutter speed calculated in the microcomputer MC; and a lens circuit LC, formed in an interchangeable lens, outputs various inherent data of the lens.

A liquid crystal display part DSP reads display data transmitted from the microcomputer MC, decodes the data for the liquid crystal display, and performs a display according to the decoded data. FIG. 20 shows an example of the display of the liquid crystal display device. FIG. 20A shows the state wherein all of the segments are lit. Note the segment DP1 is lit at the AE lock mode but no lit at the normal mode (non-AE lock mode); the segment DP2 numerically displays the shutter speed; the segment DP3 numerically displays the aperture value, and the segment DP4 displays the light measurement mode. Both segments DP$_2$ and DP$_3$ are lit when the light measuring switch S$_1$ is closed, or for 10 seconds from when the light measurement switch S$_1$ is opened. Namely, in the average light measurement mode, a surrounding frame alone is displayed, and in the spot light measuring mode, the surrounding frame and a dot contained in the frame are displayed. FIG. 20B shows the display state in the normal mode (non-AE lock mode) and the average light measurement mode. FIGS. 20C and 20D show the display state in the AE lock mode and the spot light measurement mode. FIG. 20C shows the display state when the light measurement switch S$_1$ is closed, and FIG. 20D shows the display state in the AE lock and spot light measurement mode when the light measurement switch S$_1$ is open. All of the circuits except the light measurement circuit LMP are directly energized by the battery BA through a power source line +E.

Figures 2, 21A:
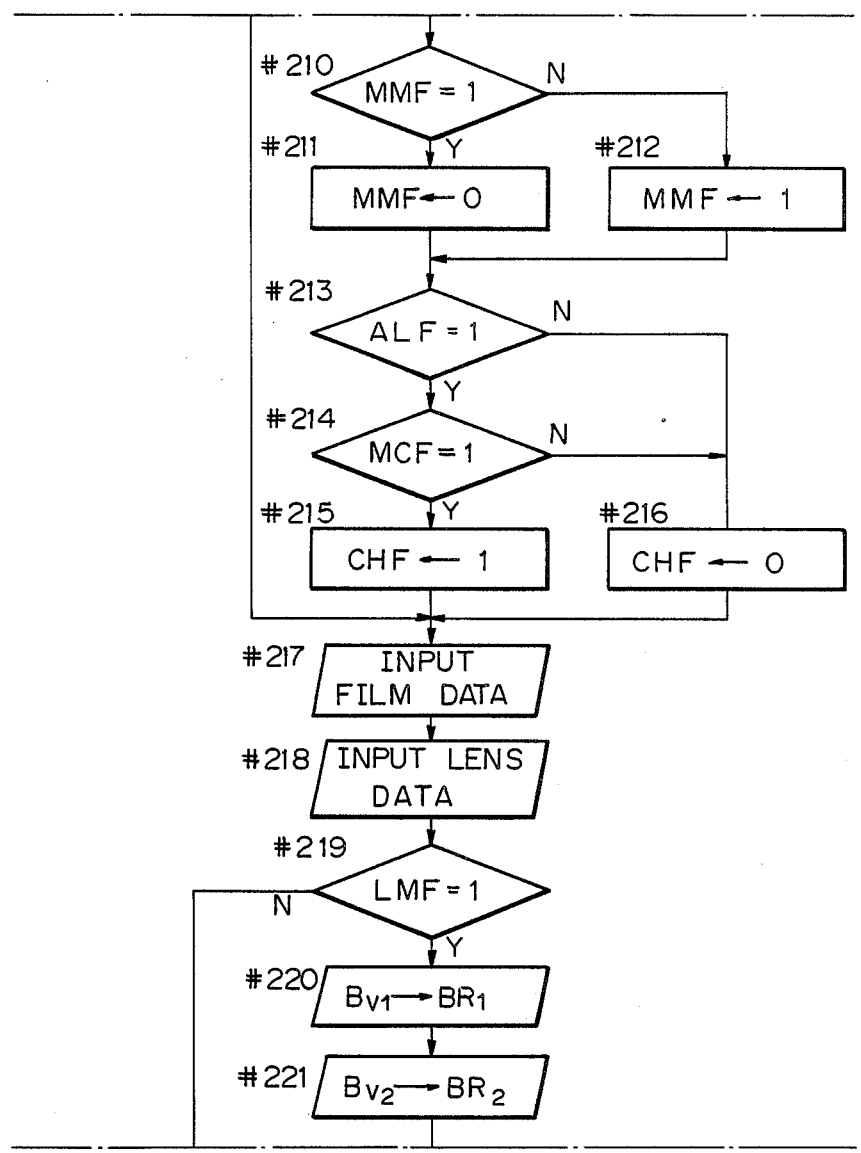
FIGS. 21A and 21B are flow charts showing operating procedures of the circuit shown in FIG. 18.
Figures 3, 21A:
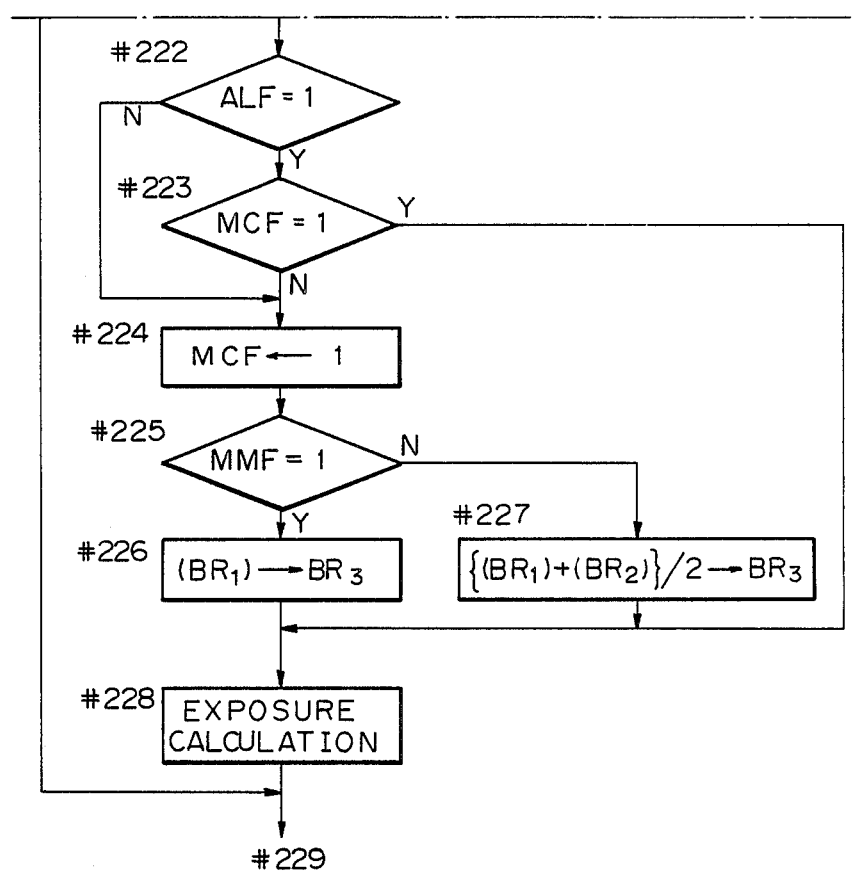
Figures 2, 21B:
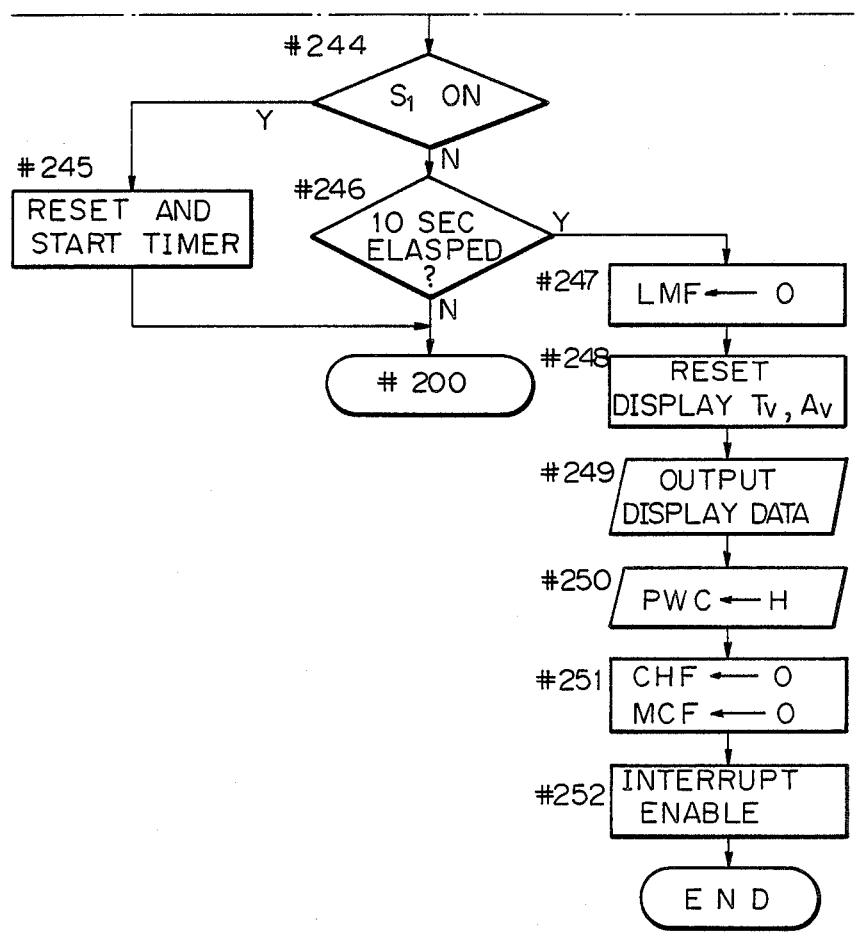

The operation of this embodiment will now be described with reference to flow charts of the microcomputer MC shown in FIGS. 21A and 21B. If any of the switches S$_1$, S$_2$, ALS, and MMS are manually closed, a low level signal is input to the interrupt terminal $\overline{INT}$ to start the microcomputer, and the operation is started at step #200. First, it is determined whether or not the light measurement switch S$_1$ is closed from the open state (#200). If the switch S$_1$ is closed from the open state, the routine goes to step #201. If the switch S$_1$ is kept opened or kept closed, the routine jumps to step #205. At step #201, flags CHF and MFC (described hereinafter) are set at "0" and a flag LMF is set at "1", to produce a state wherein light measurement and exposure calculation are possible. When the flag LMF is set at "1", light measurement and exposure calculation are performed at steps #220 through #228 described hereinafter. When the flag LMF is set at "0", light measurement and exposure calculation are no performed. The output line PWC is then maintained at a low level and the transistor BT turned ON to supply power to the light measurement circuit (#202). After the lapse of a certain time necessary for stabilizing the output of the light measurement circuit LMP (that is, the outputs of the operational amplifiers OA1 and OA2) from the point at which power is supplied (#203), the output line LEN is changed to a low level (#204), and the contents of the latch circuits LA1 and LA2 are then renewed at every 250 ms as described above.

Then it is determined whether or not the AE lock switch is closed from the open state (#205). If the AE lock switch ALS is closed from the open state, the routine goes to step #206, and if the AE lock switch ALS is kept opened or kept closed, the routine goes to step #209.

At step #206, it is determined whether or not the flag ALF is set at "1", and if the flag ALF is "1", the flag ALF and flag CHF (described hereinafter) are set at "0" (#207). If the flag ALF is "0", the flag ALF is set at "1" (#208). When the flag ALF is "1", the AF lock mode is set, and when the flag ALF is "0", the normal mode (non-AE lock mode) is set. Accordingly, these two modes are interchanged every time the switch ALS is closed.

At step #209, it is determined whether or not the switch MMS is closed from the open state. If the switch MMS is closed from the open state, the routine goes to step #210, and if the switch MMS is kept opened or kept closed, the routine goes to step #217. At step #210, it is determined whether or not the flag MMF is set at "1". If the flag MMF is "1", the flag MMF is set at "0" (#211), and if the flag MMF is "0", the flag MMF is set at 1 (#212). When the flag MMF is "1", the spot light measurement mode is set, and when the flag MMF is "0", the average light measurement mode is set. Accordingly, the two light measuring modes are interchanged every time the switch MMS is closed. After this change of the light measurement mode, it is determined from the flag ALF whether or not the mode is the AE lock mode (#213). If the mode is not the AE lock mode, the flag CHF is set at "0" (#216), and the routine goes to step #217. On the other hand, if the mode is the AE lock mode, it is determined whether or not the flag MCF is set at "1" (#214). When the fetch of the light measurement data is terminated, the flag MCF is set at "1". If the fetch of the light measurement data is not terminated, the flag MCF is set at "0". When the flag MCF is set at 1, the flag CHF is set at "1" (#215), and when the flag MCF is set at 0, the flag CHF is set at "0" (#216) and the routine goes to step #217. When the flag CHF is "1", the flag CHF inhibits any change of the display of the light measurement mode, and when the flag CHF is "0", a change of the display of the light measurement mode is allowed. Accordingly, when storage of the light measurement data is completed at the AE lock mode, the flag CHF is set at "1" so that the display of the light measurement mode at the time of the AE lock is not changed, even if the light measurement mode is changed by the switch MMS. Namely, even if the AE lock is executed and a change of the light measurement mode is intended at the AE lock state, the light measurement at the light measurement mode at the AE lock is locked and the display of the light measurement mode is not changed. In this state, if the AE lock switch ALS is operated to produce the non-AE lock mode, the flag CHF is set at "0" at step #207 and therefore, the light measurement of the light measurement mode corresponding to the content of the flag MMT is executed and this light measurement mode is displayed. When the light measurement switch $S_1$ is opened and then closed again, the flag CHF is set at "0" (#201) and, therefore, the operation according to the content of the flag MMF is similarly performed. To determine that the switch is closed from the open state at steps #200, #205, and #209, a flag for storing the state of the switch is provided. For example, if the switch, the open state of which is stored by this flag, is closed, it is determined that the switch is closed from the open state.

At step #217, the data from the film sensitivity output circuit SD is input, and at step #218, the lens data from the lens circuit LC is input. Then, it is determined whether or not the flag LMF is set at "1". If the flag LFG is "0", this indicates that starting has been effected by the switches ALS and MMD. The light measurement and exposure calculations at steps #220 through #228, however, are not executed, and the routine goes to step #229. On the other hand, if the flag LMF is "1", the light measurement and exposure calculations are executed according to the following procedures. First, light measurement data $B_{v1}$ and $B_{v2}$ are read from the latch circuits LA1 and LA2 of the light measurement circuit LMP and set in the registers BR1 and BR2 (#220 and #221). Then, it is determined whether or not the flag ALF is "1" (#222). If the flag ALF is "0", the normal mode is set and, therefore, the routine goes to step #224. On the other hand, if the flag ALF is "1", the AE lock mode is set, and it is determined whether or not the flag MCF is set at "1", and thus it is determined whether or not the fetch of the light measurement data is terminated (#223). When the data fetch is terminated, the light measurement at the time of the AE lock is held and the routine goes to step #228 to execute the exposure calculation. If the fetch of the light measurement is not terminated at either the non-AE lock mode or the AE lock mode the routine goes to step #224 to set the flag MCF at "1", and then the light measurement mode is determined (#225). If the set mode is the spot light measurement mode (MMF=1), the content of the register BR1 is set as the light measurement data in the register BR3, and if the set mode is the average light measurement mode $B_{v1}$ (MMF=0) (#226), the average value $(B_{v1}+B_{v2})/2$ of the contents of the registers BR1 and BR2 is set as light measurement data into the register BR3 (#227).

Then, at step #228, the exposure calculation is executed based on the film sensitivity and lens data, and the light measurement data set in the register BR3, to calculate the aperture value and shutter speed.

At step #229, it is determined whether or not the set mode is the AE lock mode, and if the set mode is the AE lock mode, the display data ALD for lighting the segment DP1 displaying the AE lock is set (#230), and if the set mode is not the AE lock mode, the display data ALD is reset (#231). Then, it is determined whether or not the flag CHF is set at "1" (#232), and if the flag CHF is "1", since a change of the display of the light measurement mode is inhibited, the routine goes to step #238. On the other hand, if the flag CHF is set at "0", the light measurement mode is determined (#233), and if the mode is the spot light measurement mode, the display data SPD for lighting the dot mark indicating the spot light measurement is set (#234). If the mode is the average light measurement mode, the display data PSD is reset (#235). Then, at step #238, it is determined whether or not the state allowing light measurement and exposure calculation is attained, and if this state is attained, the calculated time data TV and aperture value data AV for the display are set (#239). After the foregoing operations, the set display data is transmitted to the display part DSP (#241).

Then, it is determined whether or not the release switch S2 is closed (#242), and if the release switch S2 is closed, the exposure control is executed (#243). If the switch S2 is not closed, the routine goes immediately terminated, preferably the flags CHF and MCF are set at "0", so that a new light measurement and exposure calculation becomes possible.

Then, at step #244, it is determined whether or not the light measurement switch $S_1$ is closed. If the light measurement switch $S_1$ is closed, a timer arranged within the microcomputer MC is reset, counting thereof is started, and the routine returns to step #200. On the other hand, if the light measurement switch $S_1$ is opened, it is determined whether or not a count of 10 seconds by the timer has terminated (#246). If the count has not terminated, the routine returns to step #200. Accordingly, while the light measurement switch $S_1$ is closed, the light measurement and exposure calculation, and display thereof, are repeated. In the AE lock mode, even if the light measurement switch $S_1$ is opened, the light measurement obtained by the AE lock is held for 10 seconds. Accordingly, if the light measurement switch $S_1$ is closed again during this period of 10 seconds, since the flag MCF is set at "0" at step #201, the AE lock is again executed. Simultaneously, the inhibition of a change of the light measurement mode is released, because the flag CHF is set at "0" at this step #201.

If it is determined at step #246 that 10 seconds have passed from the opening of the light measurement switch $S_1$, the flag LMF for execution of the light measurement and exposure calculation is set at "0" (#247), and the display data TV and AV are reset, and thus the state in which the shutter speed and aperture value are not displayed is attained (#248). This data is transmitted to the display part DSP (#249). Then the output line PWC is changed to a high level to stop the power supply to the light measurement circuit LMP (#250), the flags CHF and MCF are set at "0" (#251), and interruption is allowed (#252), stopping the operation of the microcomputer MC.

In the present embodiment, the AE lock is executed when the AE lock switch ALS is operated to produce the AE lock mode and the light measurement switch $S_1$ is closed in this state, or when the AE lock switch ALS is operated in the state where the light measurement switch $S_1$ is closed. However, the present embodiment also can be applied to a so-called one-shot type autofocus (AF) camera in which the focus detection is effected in response to depression of a shutter release button, a focus adjusting lens for a camera is driven based on the result of the focus detection, and after the focus adjusting lens is driven to the in-focus position, subsequent driving of the lens is inhibited while the shutter release button remains depressed.

Namely, in this autofocus camera, the light measurement at the time of inhibition of the driving of the lens is AE-locked. More specifically, after the light measurement corresponding to the light measurement mode at the time of completion of the autofocusing is AE-locked, even if the light measurement mode is changed, if the released button remains depressed, the AE locked value at the time of completion of the autofocusing is held and the display of the light measurement mode at the time of completion of the autofocusing is not changed. When the release button is released, the changed light measurement mode is displayed, and when the release button is depressed again, the light measurement and exposure calculation are performed according to the changed light measurement mode. When the autofocusing is completed, the light measurement at this light measurement mode is AE-locked.

FIG. 22 shows another embodiment in which the AE lock operation is carried out in the above-mentioned one-shot type autofocusing camera. This circuit is almost the same as that of FIG. 18, except that the AE lock switch ALS of FIG. 18 is replaced with an autofocusing circuit AF. Since the other components are the same as those of FIG. 18, only the autofocusing circuit AF will be explained below. The autofocusing circuit AF has a focus detecting part and a lens driving control part. A focus adjusting lens is driven on the basis of the result of the focus detection. When the lens reaches an in-focus position, the lens driving is stopped, and at the same time, the circuit AF outputs a signal indicating a completion of autofocusing to the input terminal $i_3$ of the microcomputer MC. The microcomputer computer MC determines the presence or absence of the signal, and thus determines whether or not the AE lock operation should be carried out.

In the foregoing embodiment, the change of the light measurement modes is performed by manually operated switches. There are two light measurement modes, that is, average and spot light measurement modes, and thus two photoelectric devices are provided. The present embodiment also can be applied to a camera in which at least three photoelectric devices are provided, the brightness distribution of an object to be photographed is determined according to the outputs of these photoelectric devices, and the light measurement pattern, that is, the light measurement mode, is automatically changed according to that determination. More specifically, even if the brightness distribution and photographic conditions are changed from those at the time of the AE lock, the light measurement value at time of AE lock is held and the light measurement value is displayed as it is, and when the AE lock is released, the light measurement mode is changed.

In the foregoing embodiment, when the light measurement switch $S_1$ is closed, or for a certain time from when the light measurement switch $S_1$ is opened, light measurement, exposure calculation, and display can be performed. Furthermore, a modification may be adopted in which light measurement, exposure calculation, and display can be performed when the AE lock switch ALS is closed, or for a certain time after the opening of the AE lock switch.

We claim:

1. An exposure control device for a camera for selectively operating in a flash photography mode or in a daylight photography mode, comprising:
average light measurement means for measuring a brightness of a relatively wide region in the scene to be photographed to output an average light measurement;

spot light measurement means for measuring a brightness of a relatively narrow region in the scene to be photographed to output a spot light measurement;

mode designation means for seletively designating the flash photography mode or the daylight photography mode to output a mode designaton signal;

AE lock signal generating means for generating AE lock signal used for storing the light measurements;

AE lock means for storing a light measurement corresponding to a mode designated by said mode designation signal, such that when said AE lock signal is generated in the state where the flash photography mode is designated, the average light mesurement at that time is stored, or when the AE lock signal is generated in the state where the daylight photography mode is designated, the spot light measurement at that time is stored; and exposure comtrol means for carrying out exposure control on the basis of a light measurement which corresponds to the light measurement stored by the AE lock means if the AE lock signal is generated, or the average light measurement regardless of the mode designated by the mode designation means if an AE lock signal is not generated.

2. An exposure control device for a camera according to claim 1, wherein the mode designation means includes means for determining whether or not preparation for flash photography is completed, and designates the flash photography mode if the preparation is completed, or the daylight photography mode if the preparation is not completed.

3. An exposure control means for a camera according to claim 1, wherein the AE lock signal generating means includes a manual operation member which is manually operated independently from the shutter release operation to generate the AE lock signal in response to a manual operation.

4. An exposure control means for a camera according to claim 1, wherein the AE lock signal generating means includes auto focus means which is operated by an operation independent from the shutter release operation for driving a focusing lens in a camera on the basis of a result of a focus detection, and stops the drive of the lens when the lens is driven to an in-focus position, and said AE locked signal generating means outputs the AE lock signal in response to the driving of the lens to the in-focus position.

5. An exposure control device for a camera for selectively operating in a flash photography mode or in a daylight photography mode comprising:

light measurement means for measuring a brightness of an object to be photographed to output a light measurement;

mode designation means for selectively designating the flash photography mode or the daylight photography mode to output a mode designation signal;

AE lock signal generating means for generating an AE lock signal used for storing the light measurements;

AE lock means for storing the light measurement when the AE lock signal is generated;

rewriting means for rewriting the light measurement stored in the AE lock means if the AE lock means has already stored the light measurement at the time when a change of the photograph mode is designated by the mode designation signal; and exposure control means for carrying out exposure conrol on the basis of the light measurement stored in the AE lock means.

6. An exposure control device for a camera according to claim 5, wherein the light measurement means includes average light measurement means for measuring a brightness of a relatively wide region in the scene to be photographed to output an average light measurement; and spot light measurement means for measuring a brightness of a relatively narrow region in the scene to be photographed to output a spot light measurement, and the AE lock means stores the average light measurement if the flash photography mode is designated, or the spot light measurement if the daylight photography mode is designated.

7. An exposure control device for a camera according to claim 5, wherein the mode designation means includes means for determining whether or not preparation for flash photography is completed, and designates the flash photography mode if the preparation is completed, or the daylight photography mode if the preparation is not completed.

8. An exposure control means for a camera according to claim 5, wherein the AE lock signal generating means includes a manual operation member which is manually operated independently from the shutter release operation to generate the AE lock signal in response to a manual operation.

9. An exposure control means for a camera according to claim 5, wherein the AE lock signal generating means includes auto focus means which is operated by an operation independent form the shutter release operation for driving a focusing lens in a camera on the basis of a result of a focus detection, and stops the drive of the lens when the lens is driven to an in-focus position, and said AE locked signal generating means outputs the AE lock signal in response to the driving of the lens to the in-focus position.

10. An exposure control device for a camera comprising:

light measurement means for outputting light measurements corresponding to a plurality of light measurement regions of a scene to be photographed;

designation means for outputting a designation signal for designating the light measurement distribution, at least one of the light measurements being selected in accordance with the designation signal;

AE lock signal generating means for generating an AE lock signal used for storing the light measurements;

AE lock means for storing the light measurement of the light measurement distribution designated when the AE lock signal is output;

rewriting means for rewriting the light measurement stored in the AE lock means if AE lock means has already stored the light measurement when a change of the light measurement distribution is instructed by the designation signal; and exposure control means for carrying out exposure control on the basis of the light measurement stored in the AE lock means.

11. An exposure control device for a camera according to claim 10, wherein the plurality of light measurement regions includes a first light measurement region for the measurement of an average brightness of the scene to be photographed; and a second light measurement region for the measurement of a brightness of only a central portion of the scene to be photographed.

12. An exposure control means for a camera according to claim 10, wherein the AE lock signal generating means includes a manual operation member which is manually operated independently from the shutter release operation to generate the AE lock signal in response to a manual operation.

13. An exposure control means for a camera according to claim 10, wherein the AE lock signal generating means includes auto focus means which is operated by an operation independent form the shutter release operation for driving a focusing lens in a camera on the basis of a result of a focus detection, and stops the drive of the lens when the lens is driven to an in-focus position, and said AE locked signal generating means outputs the AE lock signal in response to the driving of the lens to the in-focus position.

14. An exposure control device for a camera comprising:
light measurement means for outputting light measurements corresponding to a plurality of light measurement regions of a scene to be photographed;
designation means for outputting a designation signal for designating the light measurement distribution, at least one of the light measurements being selected in accordance with the designation signal;
indication means for indicating the light measurement distribution designated by the designation signal;
AE lock signal generating means for generating an AE lock signal used for storing the light measurements;
AE lock means for storing the light measurement of the light measurement distribution designated when the AE lock signal is output;
inhibiting means for inhibiting a change of the indication of the light measurement distribution by the indication means according to the designation signal if the AE lock means has already stored the light measurement when a change of the light measurement distribution is instructed by the designation signal; and
exposure control means for carrying out exposure control on the basis of the light measurement stored in the AE lock means.

15. An exposure control device for a camera according to claim 14, wherein the light measurement means includes a first measurement distribution for the measurement of an average brightness of the scene to be photographed and a second light measurement distribution for the measurement of a brightness of only a central portion of the scene to be photographed.

16. An exposure control means for a camera according to claim 14, wherein the AE lock signal generating means includes a manual operation member which is manually operated independently from the shutter release operation to generate the AE lock signal in response to a manual operation.

17. An exposure control means for a camera according to claim 14, wherein the AE lock signal generating means includes auto focus means which is operated by an operation independent form the shutter release operation for driving a focusing lens in a camera on the basis of a result of a focus detection, and stops the drive of the lens when the lens is driven to an in-focus position, and said AE locked signal generating means outputs the AE lock signal in response to the driving of the lens to the in-focus position.

18. An exposure control device for a camera, comprising:
first light measuring means for outputting an average light measurement corresponding to a brightness of an entire scene to be photographed,
second light measuring means for outputting a spot light measurement corresponding to a brightness of a part of the scene to be photographed,
a manually operated AE lock switch which can be changed between a non-AE lock position and an AE lock position,
signal output means for outputting a signal indicating daylight photography exposure by daylight alone or flash photography exposure by flash light in combination with daylight,
light measurement selecting means for selectively outputting the average light measurement from the first light measuring means or the spot light measurement form the second light measuring means according to the position of the AE lock switch and the signal output by the signal output means, and
exposure control means for controlling an exposure based on the light measurement output from the selecting means,
wherein when the daylight photography signal is output, the selecting means outputs the average light measurement at the time of the shutter release operation with the AE lock switch in the non-AE lock position and outputs the spot light measurement at the time of the AE lock operation with the AE lock switch in the AE lock position, and when the flash photography signal is input, the selecting means outputs the average light measurement at the time of a shutter release operation with the AE lock switch in the non-AE lock position and outputs the average light measurement at the time of AE lock operation with the AE lock switch in the AE lock position.

* * * * *